US011865838B2

(12) United States Patent
Takabe et al.

(10) Patent No.: US 11,865,838 B2
(45) Date of Patent: Jan. 9, 2024

(54) PIEZOELECTRIC DEVICE, LIQUID EJECTING HEAD, LIQUID EJECTING APPARATUS, AND METHOD OF MANUFACTURING PIEZOELECTRIC DEVICE

(71) Applicant: SEIKO EPSON CORPORATION, Tokyo (JP)

(72) Inventors: Motoki Takabe, Shiojiri (JP); Yasuhiro Itayama, Kai (JP)

(73) Assignee: Seiko Epson Corporation, Tokyo (JP)

( * ) Notice: Subject to any disclaimer, the term of this patent is extended or adjusted under 35 U.S.C. 154(b) by 37 days.

(21) Appl. No.: 17/452,605

(22) Filed: Oct. 28, 2021

(65) Prior Publication Data

US 2022/0134752 A1 May 5, 2022

(30) Foreign Application Priority Data

Oct. 30, 2020 (JP) ................................ 2020-182234

(51) Int. Cl.
*B41J 2/14* (2006.01)
*B41J 2/16* (2006.01)

(52) U.S. Cl.
CPC ........... *B41J 2/14233* (2013.01); *B41J 2/161* (2013.01); *B41J 2002/14258* (2013.01); *B41J 2002/14266* (2013.01)

(58) Field of Classification Search
None
See application file for complete search history.

(56) References Cited

U.S. PATENT DOCUMENTS

| | | | | |
|---|---|---|---|---|
| 9,308,727 | B2 | 4/2016 | Hirai et al. | |
| 2013/0141495 | A1* | 6/2013 | Itayama | B41J 2/04581 347/68 |
| 2015/0364674 | A1* | 12/2015 | Sasaki | C30B 29/60 310/311 |
| 2017/0092836 | A1* | 3/2017 | Chen | H10N 30/079 |
| 2017/0365773 | A1* | 12/2017 | Numazawa | H10N 30/079 |

FOREIGN PATENT DOCUMENTS

| | | |
|---|---|---|
| JP | 2015-171809 | 10/2015 |

* cited by examiner

*Primary Examiner* — Erica S Lin
(74) *Attorney, Agent, or Firm* — WORKMAN NYDEGGER

(57) ABSTRACT

A piezoelectric body layer of a first area has (100) plane preferential orientation, and a (100) plane orientation ratio of the piezoelectric body layer of a second area is lower than a (100) plane orientation ratio of the piezoelectric body layer of the first area, when one area far from an end portion of a second electrode is the first area, and one area near the end portion of the second electrode is the second area, of two areas of the second electrode in a second direction intersecting a first direction.

16 Claims, 14 Drawing Sheets

PIEZOELECTRIC DEVICE, LIQUID EJECTING HEAD, LIQUID EJECTING APPARATUS, AND METHOD OF MANUFACTURING PIEZOELECTRIC DEVICE

The present application is based on, and claims priority from JP Application Serial Number 2020-182234, filed Oct. 30, 2020, the disclosure of which is hereby incorporated by reference herein in its entirety.

BACKGROUND

1. Technical Field

The present disclosure relates to a piezoelectric device, a liquid ejecting head, and a liquid ejecting apparatus that include a diaphragm and a piezoelectric actuator having a first electrode, a piezoelectric body layer, and a second electrode, and a method of manufacturing the piezoelectric device.

2. Related Art

A typical example of a liquid ejecting head, which is one of the piezoelectric devices, is an ink jet recording head that ejects ink droplets. It is known that the ink jet recording head includes, for example, a flow path forming substrate in which a pressure chamber communicating with a nozzle is formed, and a piezoelectric actuator provided on the side of one surface of the flow path forming substrate via a diaphragm, and an ink droplet is ejected from a nozzle by causing a pressure change in the ink in the pressure chamber by the piezoelectric actuator.

It is known that the piezoelectric actuator includes a first electrode formed on the diaphragm, a piezoelectric body layer formed of a piezoelectric material having electromechanical conversion characteristics on the first electrode, and a second electrode provided on the piezoelectric body layer. In the piezoelectric actuator having this configuration, there is a concern that cracks, burnout, or the like may occur in the piezoelectric body layer due to the bending deformation of the piezoelectric body layer. Various configurations of the piezoelectric actuators (piezoelectric elements) have been proposed for the purpose of suppressing the occurrence of such defects (see, for example, JP-A-2015-171809).

In JP-A-2015-171809, it is described that the piezoelectric element extends to the outside of the opening of the pressure chamber vacancy portion, and the width of the first electrode layer constituting the piezoelectric element is narrowed compared to the area corresponding to the pressure chamber vacancy portion, on the outside of the pressure chamber vacancy portion.

In the configuration in which the piezoelectric actuator extends to the outside of the pressure chamber, there is a problem that cracks occur in the piezoelectric body layer as described above, but further, the piezoelectric body layer extended to the outside of the pressure chamber does not bend and deform at a time when a voltage is applied, and thus heat is generated due to the current flowing at that time. As the performance of the piezoelectric body layer is improved, the heat generated by the piezoelectric body layer tends to increase, and the heat generated may damage the piezoelectric actuator.

Such a problem is not limited to the liquid ejecting head represented by the ink jet recording head that ejects ink, and is also present in other piezoelectric devices in a similar manner.

SUMMARY

According to an aspect of the present disclosure, a piezoelectric device includes a substrate on which a plurality of recess portions are formed, a diaphragm provided on a side of one surface of the substrate, and a piezoelectric actuator having a first electrode, a piezoelectric body layer, and a second electrode which are stacked in a first direction on a side of a surface opposite to the substrate of the diaphragm, in which when one area far from an end portion of the second electrode is a first area, and one area near the end portion of the second electrode is a second area, of two areas of the second electrode in a second direction intersecting the first direction, the piezoelectric body layer in the first area has (100) plane preferential orientation, and a (100) plane orientation ratio of the piezoelectric body layer in the second area is lower than a (100) plane orientation ratio of the piezoelectric body layer in the first area.

According to another aspect of the present disclosure, a liquid ejecting head includes a substrate on which a plurality of recess portions are formed, a diaphragm provided on a side of one surface of the substrate, and a piezoelectric actuator having a first electrode, a piezoelectric body layer, and a second electrode which are stacked in a first direction on a side of a surface opposite to the substrate of the diaphragm, in which when one area far from an end portion of the second electrode is a first area, and one area near the end portion of the second electrode is a second area, of two areas of the second electrode in a second direction intersecting the first direction, the piezoelectric body layer in the first area has (100) plane preferential orientation, and a (100) plane orientation ratio of the piezoelectric body layer in the second area is lower than a (100) plane orientation ratio of the piezoelectric body layer in the first area.

According to still another aspect of the present disclosure, a liquid ejecting apparatus includes the liquid ejecting head.

According to still another aspect of the present disclosure, a method of manufacturing a piezoelectric device including a substrate on which a plurality of recess portions are formed, a diaphragm provided on a side of one surface of the substrate, and a piezoelectric actuator having a first electrode, a piezoelectric body layer, and a second electrode which are stacked in a first direction on a side of a surface opposite to the substrate of the diaphragm, in which when one area far from an end portion of the second electrode is a first area, and one area near the end portion of the second electrode is a second area, of two areas of the second electrode in a second direction intersecting the first direction, the piezoelectric body layer in the first area has (100) plane preferential orientation, and a (100) plane orientation ratio of the piezoelectric body layer in the second area is lower than a (100) plane orientation ratio of the piezoelectric body layer in the first area, the method includes forming an orientation control layer for controlling crystal orientation of the piezoelectric body layer as forming the piezoelectric actuator by stacking the first electrode, the piezoelectric body layer, and the second electrode on a surface of the diaphragm provided on the substrate, in which in the forming the orientation control layer, the orientation control layer is formed to have different thicknesses in the first area and the second area.

DESCRIPTION OF EXEMPLARY EMBODIMENTS

Figure 1:
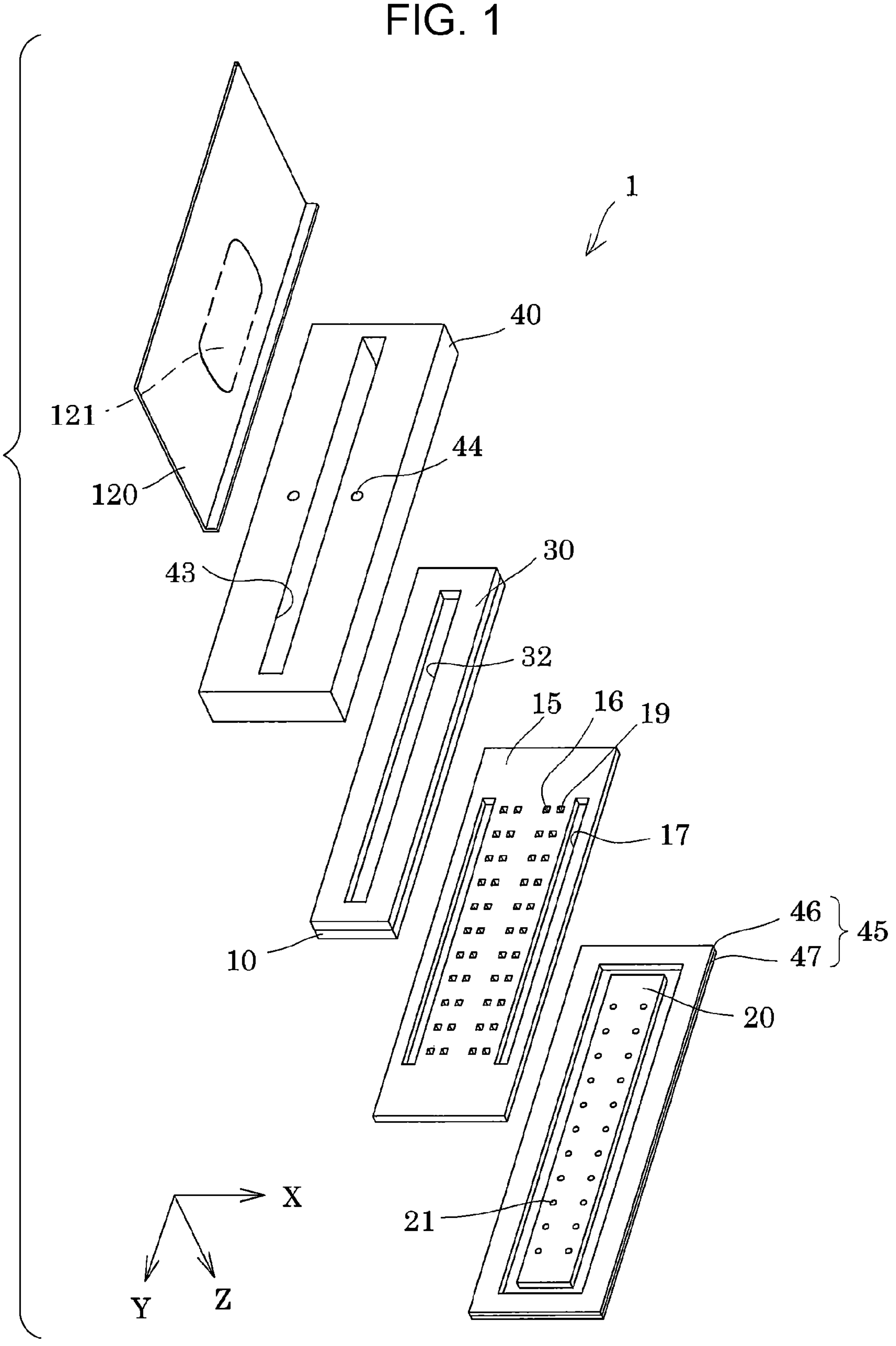
FIG. 1 is an exploded perspective view of a recording head according to a first embodiment.

Hereinafter, the present disclosure will be described in detail based on embodiments. However, the following description is a description in regard to one aspect of the present disclosure, and the configuration of the present disclosure can be optionally changed within the scope of the disclosure. In each figure, the same members are designated by the same reference numerals, and redundant descriptions will be omitted.

Further, in each figure, X, Y, and Z represent three spatial axes that are orthogonal to each other. In the present specification, the directions along these axes are the X direction, the Y direction, and the Z direction. The direction in which the arrow in each figure points is the positive (+) direction, and the opposite direction of the arrow is the negative (−) direction. Further, the Z direction indicates a vertical direction, the +Z direction indicates a vertically downward direction, and the −Z direction indicates a vertically upward direction. Further, the three X, Y, and Z spatial axes that do not limit the positive direction and the negative direction will be described as the X axis, the Y axis, and the Z axis.

First Embodiment

Figure 2:
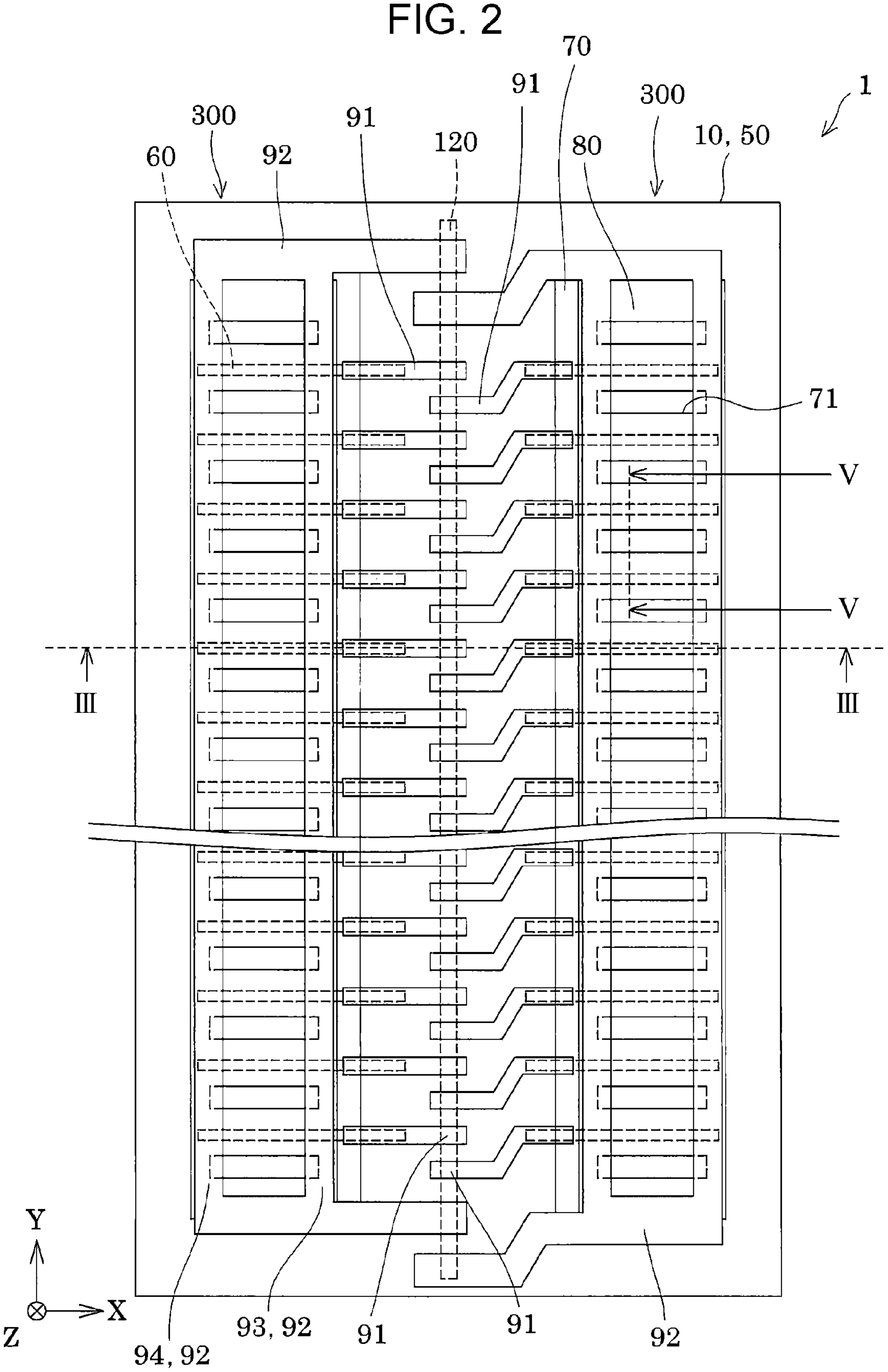
FIG. 2 is a plan view of a recording head according to the first embodiment.
Figure 3:
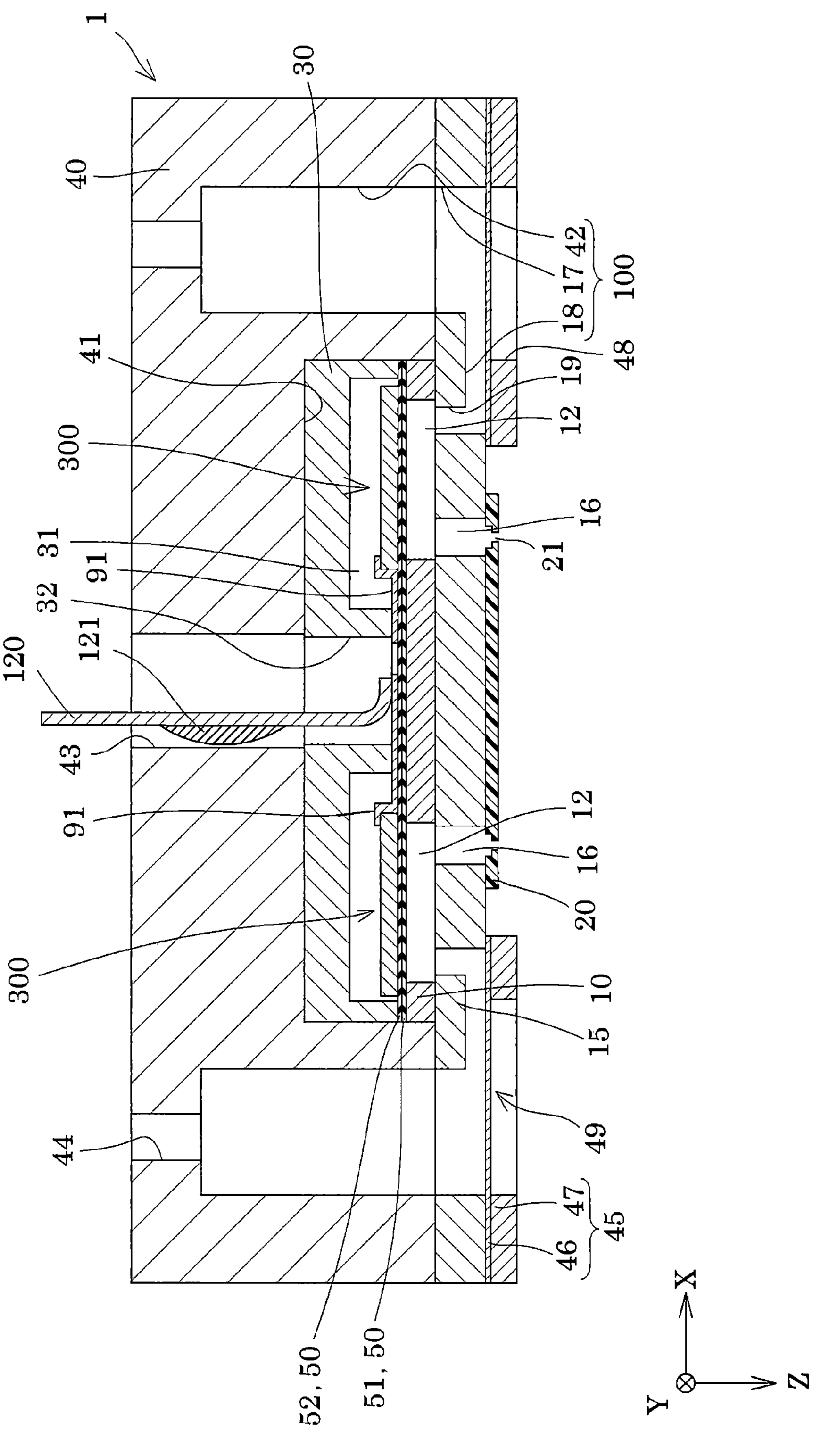
FIG. 3 is a sectional view of a recording head according to the first embodiment.
Figure 4:
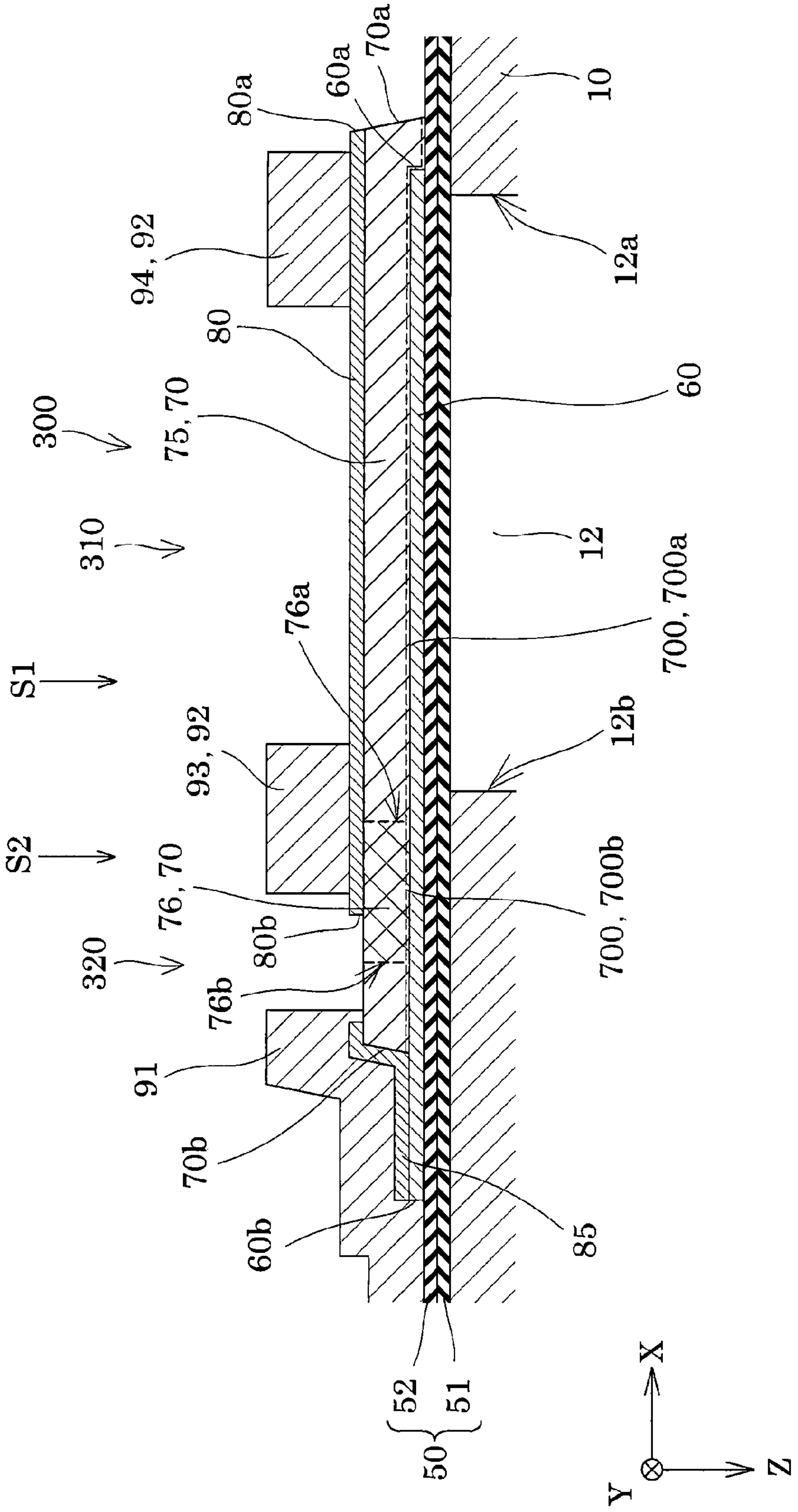
FIG. 4 is a sectional view of a main portion of the recording head according to the first embodiment.
Figure 5:
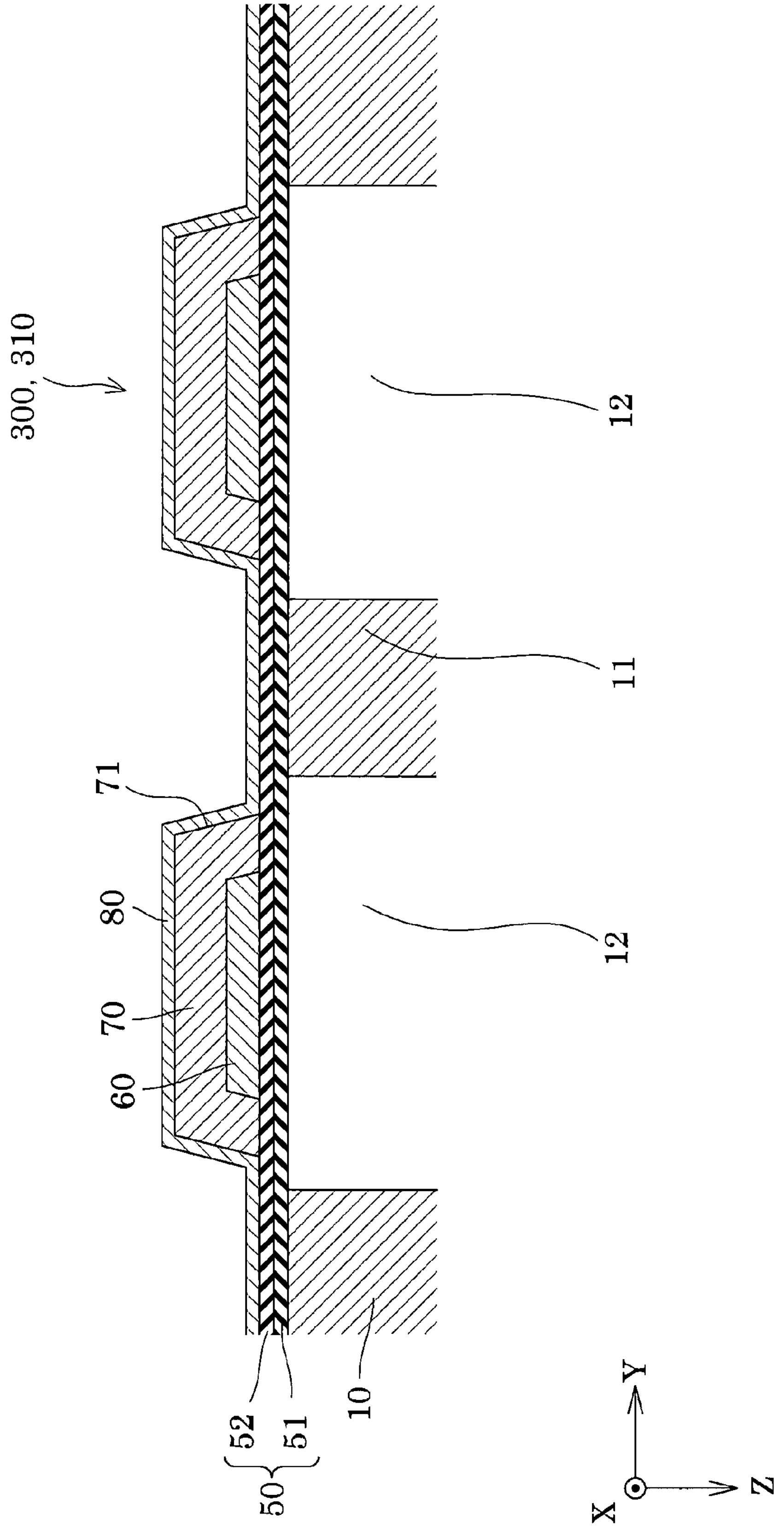
FIG. 5 is a sectional view of the recording head according to the first embodiment.

FIG. 1 is an exploded perspective view of an ink jet recording head which is an example of a liquid ejecting head according to a first embodiment of the present disclosure. FIG. 2 is a plan view of the recording head. FIG. 3 is a sectional view taken along the line III-III of FIG. 2, FIG. 4 is an enlarged view of the piezoelectric actuator portion in FIG. 3, and FIG. 5 is a sectional view taken along the line V-V of FIG. 2, and an enlarged view of the piezoelectric actuator portion.

As illustrated in the figure, an ink jet recording head (hereinafter, also simply referred to as a recording head) 1, which is an example of the liquid ejecting head of the present embodiment, ejects ink droplets in the Z-axis direction, which is the first direction, and more specifically, in the +Z direction.

The ink jet recording head 1 includes a flow path forming substrate 10 as an example of the substrate. The flow path forming substrate 10 is made of, for example, a silicon substrate, a glass substrate, an SOI substrate, various ceramic substrates, or the like. The flow path forming substrate 10 may be a substrate with (100) plane preferential orientation or a substrate with (110) plane preferential orientation.

On the flow path forming substrate 10, a plurality of pressure chambers 12 are disposed in two rows in the X-axis direction, which is the second direction intersecting the Z-axis direction, which is the first direction. That is, the plurality of pressure chambers 12 constituting each row are disposed along the Y-axis direction, which is a third direction intersecting the X-axis direction.

The plurality of pressure chambers 12 constituting each row are disposed on a straight line along the Y-axis direction so that the positions in the X-axis direction are in the same position. The pressure chambers 12 adjacent to each other in the Y-axis direction are partitioned by a partition wall 11. Of course, the disposition of the pressure chamber 12 is not particularly limited. For example, the disposition of the plurality of pressure chambers 12 lined up in the Y-axis direction may be a so-called staggered disposition in which each pressure chamber 12 is positioned shifted in the X-axis direction every other pressure chamber 12.

Further, the pressure chamber 12 of the present embodiment is formed in a rectangular shape, for example, in which the length in the X-axis direction is longer than the length in the Y-axis direction in plan view from the +Z direction. Of course, the shape of the pressure chamber 12 in plan view from the +Z direction is not particularly limited, and may be a parallel quadrilateral shape, a polygonal shape, a circular shape, an oval shape, or the like. The oval shape referred to here refers to a shape in which both end portions in the longitudinal direction are semicircular shapes based on a rectangular shape, and includes a rectangular shape with rounded corners, an elliptical shape, an egg shape, or the like.

A communication plate 15, a nozzle plate 20, and a compliance substrate 45 are sequentially stacked on the side of the +Z direction of the flow path forming substrate 10.

The communication plate 15 is provided with a nozzle communication passage 16 that communicates the pressure chamber 12 and a nozzle 21. Further, the communication plate 15 is provided with a first manifold portion 17 and a second manifold portion 18 that form a portion of a manifold 100 that serves as a common liquid chamber with which the plurality of pressure chambers 12 communicate. The first manifold portion 17 is provided to penetrate the communication plate 15 in the Z-axis direction. Further, the second manifold portion 18 is provided to open on the surface on the side of the +Z direction without penetrating the communication plate 15 in the Z-axis direction.

Further, the communication plate 15 is provided with a supply communication passage 19 communicating with one end portion of the pressure chamber 12 in the X-axis direction independently of each of the pressure chambers 12. The supply communication passage 19 communicates the second manifold portion 18 with each of the pressure chambers 12, and supplies the ink in the manifold 100 to each pressure chamber 12.

As the communication plate 15, a silicon substrate, a glass substrate, an SOI substrate, various ceramic substrates, a metal substrate, or the like can be used. Examples of the metal substrate include a stainless steel substrate or the like. It is preferable that the communication plate 15 uses a material having a thermal expansion coefficient substantially the same as that of the flow path forming substrate 10. As a result, when the temperatures of the flow path forming substrate 10 and the communication plate 15 change, the warpage of the flow path forming substrate 10 and the communication plate 15 due to the difference in the thermal expansion coefficient can be suppressed.

The nozzle plate 20 is provided on the opposite side of the communication plate 15 of the flow path forming substrate 10, that is, on the surface on the side of the +Z direction. In the nozzle plate 20, the nozzle 21 is formed communicating with each pressure chamber 12 via the nozzle communication passage 16.

In the present embodiment, a plurality of nozzles 21 are disposed side by side to form a row along the Y-axis direction. The nozzle plate 20 is provided with two nozzle rows in the X-axis direction in which the plurality of nozzles 21 are arranged in a row. That is, the plurality of nozzles 21 in each row are disposed so that the positions in the X-axis direction are in the same position. The disposition of the nozzle 21 is not particularly limited. For example, the nozzles 21 disposed side by side in the Y-axis direction may be disposed at positions shifted in the X-axis direction every other nozzle 21.

The material of the nozzle plate 20 is not particularly limited, and for example, a silicon substrate, a glass substrate, an SOI substrate, various ceramic substrates, and a metal substrate can be used. Examples of the metal plate include a stainless steel substrate or the like. Further, as the material of the nozzle plate 20, an organic substance such as a polyimide resin can be used. However, it is preferable to use a material for the nozzle plate 20 that has substantially the same thermal expansion coefficient as the thermal expansion coefficient of the communication plate 15. As a result, when the temperatures of the nozzle plate 20 and the communication plate 15 change, the warpage of the nozzle plate 20 and the communication plate 15 due to the difference in the thermal expansion coefficient can be suppressed.

The compliance substrate 45 is provided together with the nozzle plate 20 is provided on the opposite side of the communication plate 15 of the flow path forming substrate 10, that is, on the surface on the side of the +Z direction. The compliance substrate 45 is provided around the nozzle plate 20 and seals the openings of the first manifold portion 17 and the second manifold portion 18 provided in the communication plate 15. In the present embodiment, the compliance substrate 45 includes a sealing film 46 made of a flexible thin film and a fixed substrate 47 made of a hard material such as metal. The area of the fixed substrate 47 facing the manifold 100 is an opening portion 48 completely removed in the thickness direction. Accordingly, one surface of the manifold 100 is a compliance portion 49 sealed only by the flexible sealing film 46.

On the other hand, on the opposite side of the nozzle plate 20 or the like of the flow path forming substrate 10, that is, on the surface on the side of the −Z direction, the diaphragm 50 and a piezoelectric actuator 300 that bends and deforms the diaphragm 50 to cause a pressure change in the ink inside the pressure chamber 12, which will be described in detail later, are provided. FIG. 3 is a view for explaining the overall configuration of the recording head 1, and illustrates the configuration of the piezoelectric actuator 300 in a simplified manner.

A protective substrate 30 having substantially the same size as the flow path forming substrate 10 is further bonded to the surface of the flow path forming substrate 10 on the side of the −Z direction with an adhesive or the like. The protective substrate 30 has a holding portion 31 which is a space for protecting the piezoelectric actuator 300. The holding portions 31 are independently provided for each row of the piezoelectric actuators 300 disposed side by side in the Y-axis direction, and are formed two side by side in the X-axis direction. Further, the protective substrate 30 is provided with a through hole 32 penetrating in the Z-axis direction between two holding portions 31 disposed side by side in the X-axis direction.

Further, on the protective substrate 30, a case member 40 for defining a manifold 100 communicating with the plurality of pressure chambers 12 together with the flow path forming substrate 10 is fixed. The case member 40 has substantially the same shape as the communication plate 15 described above in plan view, and is bonded to the protective substrate 30 and also bonded to the communication plate 15 described above.

Such case member 40 has an accommodating portion 41, which is a space having a depth configured to accommodate the flow path forming substrate 10 and the protective substrate 30, on the side of the protective substrate 30. The accommodating portion 41 has an opening area wider than the surface of the protective substrate 30 bonded to the flow path forming substrate 10. The opening surface of the accommodating portion 41 on the side of the nozzle plate 20 is sealed by the communication plate 15 in a state in which the flow path forming substrate 10 and the protective substrate 30 are accommodated in the accommodating portion 41.

Further, in the case member 40, third manifold portions 42 are defined on both of the outsides of the accommodating portion 41 in the X-axis direction. The manifold 100 of the present embodiment is constituted with the first manifold portion 17 and the second manifold portion 18 provided on the communication plate 15, and the third manifold portion 42. The manifold 100 is continuously provided in the Y-axis direction, and the supply communication passages 19 that communicate each of the pressure chambers 12 and the manifold 100 are disposed side by side in the Y-axis direction.

Further, the case member 40 is provided with an introduction port 44 for communicating with the manifold 100 and supplying ink to each manifold 100. Further, the case member 40 is provided with a coupling port 43 that communicates with the through hole 32 of the protective substrate 30 and through which a wiring substrate 120 is inserted.

In such recording head 1 of the present embodiment, ink is taken in from an introduction port 44 coupled to an external ink supply unit (not illustrated), the inside from the manifold 100 to the nozzle 21 is filled with the ink, and then according to the recording signal from a drive circuit 121, a voltage is applied to each of the piezoelectric actuators 300 corresponding to the pressure chamber 12. As a result, the diaphragm 50 bends and deforms together with the piezoelectric actuator 300, the pressure inside each of the pressure chambers 12 increases, and ink droplets are ejected from each of the nozzle 21.

Hereinafter, the configuration of the piezoelectric actuator 300 according to the present embodiment will be described. As described above, the piezoelectric actuator 300 is provided on the surface of the opposite side of the nozzle plate 20 of the flow path forming substrate 10 via the diaphragm 50.

As illustrated in FIGS. 3 to 5, the diaphragm 50 is constituted with an elastic film 51, which is made of silicon oxide, provided on the side of the flow path forming substrate 10, and an insulator film 52, which is made of a zirconium oxide film, provided on the elastic film 51. The liquid flow path of the pressure chamber 12 or the like is formed by anisotropic etching of the flow path forming substrate 10 from the surface on the side of the +Z direction, and the surface of the liquid flow path of the pressure chamber 12 or the like on the side of the −Z direction is constituted with the elastic film 51.

The configuration of the diaphragm 50 is not particularly limited. The diaphragm 50 may be constituted with, for example, either the elastic film 51 or the insulator film 52, and may further include other films other than the elastic film 51 and the insulator film 52. Examples of other film materials include silicon and silicon nitride.

The piezoelectric actuator 300 is a pressure generating unit for causing a pressure change in the ink inside the pressure chamber 12, and is also called a piezoelectric element. The piezoelectric actuator 300 includes a first electrode 60, a piezoelectric body layer 70, and a second electrode 80 that are sequentially stacked from the side of the +Z direction, which is the side of the diaphragm 50, to the side of the −Z direction. That is, the piezoelectric actuator 300 includes the first electrode 60, the piezoelectric body layer 70, the second electrode 80 which are sequentially stacked toward the side of the −Z direction along the Z-axis direction, which is the first direction with respect to the diaphragm 50 in the present embodiment.

On the other hand, in the piezoelectric actuator 300, a portion in which piezoelectric strain occurs in the piezoelectric body layer 70 when a voltage is applied between the first electrode 60 and the second electrode 80 is referred to as an active portion 310. On the other hand, a portion where the piezoelectric strain does not occur in the piezoelectric body layer 70 is referred to as an inactive portion 320. That is, in the piezoelectric actuator 300, the portion in which the piezoelectric body layer 70 is pinched between the first electrode 60 and the second electrode 80 is the active portion 310, and the portion in which the piezoelectric body layer 70 is not pinched between the first electrode 60 and the second electrode 80 is the inactive portion 320. Further, when the piezoelectric actuator 300 is driven, a portion that is actually displaced in the Z-axis direction is referred to as a flexible portion, and a portion that is not displaced in the Z direction is referred to as a non-flexible portion. That is, in the piezoelectric actuator 300, a portion that faces the pressure chamber 12 in the Z-axis direction is a flexible portion, and the outside portion of the pressure chamber 12 is a non-flexible portion.

Generally, one electrode of the active portion 310 is configured as an independent individual electrode for each active portion 310, and the other electrode is configured as a common electrode common to a plurality of active portions 310. In the present embodiment, the first electrode 60 is configured as an individual electrode, and the second electrode 80 is configured as a common electrode.

Specifically, the first electrode 60 constitutes an individual electrode that is separated for each pressure chamber 12 and is independent for each active portion 310. The first electrode 60 is formed to have a width narrower than the width of the pressure chamber 12 in the Y-axis direction. That is, in the Y-axis direction, the end portion of the first electrode 60 is positioned on the inside of the area facing the pressure chamber 12.

Further, an end portion 60*a* in the +X direction and an end portion 60*b* in the −X direction of the first electrode 60 are disposed on the outside of the pressure chamber 12, respectively. As illustrated in FIG. 4, the end portion 60*a* of the first electrode 60 in the +X direction is disposed at a position further in the +X direction than the end portion 12*a* of the pressure chamber 12 in the +X direction. The end portion 60*b* of the first electrode 60 in the −X direction is disposed at a position further in the −X direction than the end portion 12*b* of the pressure chamber 12 in the −X direction.

The material of the first electrode 60 is not particularly limited, but for example, a conductive material such as a metal such as iridium or platinum or a conductive metal oxide such as indium tin oxide abbreviated as ITO, is used.

As illustrated in FIG. 2, the piezoelectric body layer 70 is continuously provided in the Y-axis direction with a length in the X-axis direction as a predetermined length. That is, the piezoelectric body layer 70 has a predetermined thickness and is continuously provided along the side-by-side arrangement direction of the pressure chambers 12. The thickness of the piezoelectric body layer 70 is not particularly limited, but is formed to have a thickness of approximately 1 to 4 μm. Further, as illustrated in FIG. 4, the length of the piezoelectric body layer 70 in the X-axis direction is longer than the length of the pressure chamber 12 in the X-axis direction which is the longitudinal direction. Accordingly, on both sides of the pressure chamber 12 in the X-axis direction, the piezoelectric body layer 70 extends to the outside of the pressure chamber 12. As described above, the piezoelectric body layer 70 extends to the outside of the pressure chamber 12 in the X-axis direction, so that the strength of the diaphragm 50 is improved. Accordingly, when the active portion 310 is driven to displace the piezoelectric actuator 300, it is possible to suppress the occurrence of cracks or the like in the piezoelectric body layer 70.

Further, as illustrated in FIG. 4, an end portion 70*a* of the piezoelectric body layer 70 in the +X direction is positioned more outside compared to the end portion 60*a* of the first electrode 60. That is, the end portion 60*a* of the first electrode 60 in the +X direction is covered with the piezoelectric body layer 70. On the other hand, the end portion 70*b* of the piezoelectric body layer 70 in the −X direction is positioned more inside compared to an end portion 60*b* of the first electrode 60, and the end portion 60*b* of the first electrode 60 in the −X direction is not covered by the piezoelectric body layer 70.

As illustrated in FIGS. 2 and 5, the piezoelectric body layer 70 is formed with a groove portion 71 to correspond to each of the partition walls 11 and having a thickness thinner than the other areas. The groove portion 71 of the present embodiment is formed by completely removing the piezoelectric body layer 70 in the Z-axis direction. That is, the fact that the piezoelectric body layer 70 has a portion having a thickness thinner than the other areas includes the one in which the piezoelectric body layer 70 is completely removed in the Z-axis direction. Of course, the piezoelectric body layer 70 may be formed thinner than the other portions on the bottom surface of the groove portion 71.

Further, the length of the groove portion 71 in the Y-axis direction, that is, the width of the groove portion 71 is the same as or wider than the width of the partition wall 11. In the present embodiment, the width of the groove portion 71 is wider than the width of the partition wall 11.

Such groove portion 71 is formed to have a rectangular shape in plan view from the side of the −Z direction. Of course, the shape of the groove portion 71 in plan view from the side of the −Z direction is not limited to a rectangular shape, and may be a polygonal shape of pentagon or more, a circular shape, an elliptical shape, or the like.

By providing the groove portion 71 in the piezoelectric body layer 70, the rigidity of the portion of the diaphragm 50 facing the end portion of the pressure chamber 12 in the Y-axis direction, that is, the so-called arm portion of the diaphragm 50 is suppressed, and thus the piezoelectric actuator 300 can be displaced more satisfactorily.

Examples of the piezoelectric body layer 70 include a perovskite-structured crystal film (perovskite-type crystal) formed on the first electrode 60 and made of a ferroelectric ceramic material exhibiting an electromechanical conversion action. As the material of the piezoelectric body layer 70, for example, a ferroelectric piezoelectric material such as lead zirconate titanate (PZT) or a material obtained by adding a metal oxide such as niobium oxide, nickel oxide, or magnesium oxide, or the like, can be used. Specifically, lead titanate ($PbTIO_3$), lead zirconate titanate ($Pb(Zr,Ti)O_3$), lead zirconate ($PbZrO_3$), lead lanthanum titanate ($(Pb,La),TiO_3$), lead lanthanum zirconate titanate ($(Pb,La)(Zr,Ti)O_3$) or lead magnesium niobate zirconium titanate ($Pb(Zr,Ti)(Mg,Nb)O_3$), or the like, can be used. In the present embodiment, lead zirconate titanate (PZT) is used as the piezoelectric body layer 70.

Further, the material of the piezoelectric body layer 70 is not limited to the lead-based piezoelectric material containing lead, and a lead-free piezoelectric material containing no lead can also be used. Examples of lead-free piezoelectric materials include bismuth iron acid ($(BiFeO_3)$, abbreviated as "BFO"), barium titanate ($(BaTIO_3)$, abbreviated as "BT"), potassium sodium niobate ($(K,Na)(NbO_3)$, abbreviated as "KNN"), potassium sodium lithium niobate ($((K,Na,Li)(NbO_3))$), potassium sodium lithium niobate tantalate ($(K,Na,Li)(Nb,Ta)O_3$), bismuth potassium titanate ($(Bi_{1/2}K_{1/2})TiO_3$, abbreviated as "BKT"), bismuth sodium titanate ($(Bi_{1/2}Na_{1/2})TiO_3$, abbreviated as "BNT"), bismuth manganate ($BimnO_3$, abbreviated as "BM"), a complex oxide containing bismuth, potassium, titanium, and iron and having a perovskite structure ($x[(Bi_xK_{1-x})TiO_3]-(1-x)[BiFeO_3]$, abbreviated as "BKT-BF"), a complex oxide containing bismuth, iron, barium and titanium and having a perovskite structure ($(1-x)[BiFeO_3]-x[BaTIO_3]$, abbreviated as "BFO-BT") or a complex oxide added with a metal such as manganese, cobalt, and chromium ($(1-x)[Bi(Fe_{1-y}M_y)O_3]-x[BaTIO_3]$ (M is Mn, Co or Cr)), or the like.

As illustrated in FIGS. 4 and 5, the second electrode 80 is provided on the side of the −Z direction which is the opposite side of the first electrode 60 of the piezoelectric body layer 70, and is configured as a common electrode common to the plurality of active portions 310. The second electrode 80 is continuously provided in the Y-axis direction with a length in the X-axis direction as a predetermined length. The second electrode 80 is also provided on the inner surface of the groove portion 71, that is, on the side surface of the groove portion 71 of the piezoelectric body layer 70, and on the insulator film 52 which is the bottom surface of the groove portion 71. Regarding the inside of the groove portion 71, the second electrode 80 may be provided only on a portion of the inner surface of the groove portion 71, or may not be provided over the entire surface of the inner surface of the groove portion 71.

Further, as illustrated in FIG. 4, an end portion 80*a* of the second electrode 80 in the +X direction is disposed more outside compared to the end portion 60*a* of the first electrode 60 in the +X direction covered with the piezoelectric body layer 70. That is, the end portion 80*a* of the second electrode 80 in the +X direction is positioned more outside compared to the end portion 12*a* of the pressure chamber 12 in the +X direction, and more outside compared to the end portion 60*a* of the first electrode 60 in the +X direction. In the present embodiment, the end portion 80*a* of the second electrode 80 in the +X direction substantially coincides with the end portion 70*a* of the piezoelectric body layer 70. Accordingly, the end portion of the active portion 310 in the +X direction, that is, the boundary between the active portion 310 and the inactive portion 320 is defined by the end portion 60*a* of the first electrode 60.

On the other hand, the end portion 80*b* of the second electrode 80 in the −X direction is disposed more outside compared to the end portion 12*b* of the pressure chamber 12 in the −X direction, but is disposed more inside compared to the end portion 70*b* of the piezoelectric body layer 70 in the X-axis direction. As described above, the end portion 70*b* of the piezoelectric body layer 70 in the −X direction is positioned more inside compared to the end portion 60*b* of the first electrode 60. Accordingly, the end portion 80*b* of the second electrode 80 in the −X direction is positioned on the piezoelectric body layer 70 more inside compared to the end portion 60*b* of the first electrode 60 in the −X direction. Accordingly, there is present a portion in which the surface of the piezoelectric body layer 70 is exposed on the outside of the end portion 80*b* of the second electrode 80 in the −X direction.

As described above, since the end portion 80*b* of the second electrode 80 in the −X direction is disposed on the side of the +X direction compared to the piezoelectric body layer 70 and the end portion of the first electrode 60 in the −X direction, the end portion of the active portion 310 in the −X direction, that is, the boundary between the active portion 310 and the inactive portion 320 is defined by the end portion 80*b* of the second electrode 80 in the −X direction.

The material of the second electrode 80 is not particularly limited, but similarly to the first electrode 60, for example, a conductive material such as a metal such as iridium or platinum or a conductive metal oxide such as indium tin oxide, is preferably used.

Further, on the outside of the end portion 80*b* of the second electrode 80 in the −X direction, that is, further on the side of the −X direction of the end portion 80*b* of the second electrode 80, a wiring portion 85 that is formed of the same layer as the second electrode 80 but is electrically discontinuous with the second electrode 80, is provided. Further, the wiring portion 85 is formed over from the top of the piezoelectric body layer 70 to the top of the first electrode 60 extending further in the −X direction than the piezoelectric body layer 70 in a state in which an interval is spaced not to be in contact with the end portion 80*b* of the second electrode 80 in the −X direction. The wiring portion 85 is provided independently for each of the active portions 310. That is, a plurality of wiring portions 85 are disposed at a predetermined interval along the Y-axis direction. The wiring portion 85 may be formed of a layer different from that of the second electrode 80, but is preferably formed of the same layer as the second electrode 80. As a result, the manufacturing step of the wiring portion 85 can be simplified and the cost can be reduced.

Further, an individual lead electrode 91 and a common lead electrode 92, which is a common driving electrode, are coupled to the first electrode 60 and the second electrode 80 that constitute the piezoelectric actuator 300, respectively. The flexible wiring substrate 120 is coupled to an end portion on the opposite side of the end portions of the individual lead electrode 91 and the common lead electrode 92 coupled to the piezoelectric actuator 300. In the present embodiment, the individual lead electrode 91 and the common lead electrode 92 are extended to be exposed in a through hole 32 formed in the protective substrate 30, and are electrically coupled to the wiring substrate 120 in the through hole 32. A drive circuit 121 having a switching element for driving the piezoelectric actuator 300 is mounted on the wiring substrate 120.

In the present embodiment, the individual lead electrode 91 and the common lead electrode 92 are made of the same layer, but are formed to be electrically discontinuous. As a result, the manufacturing step can be simplified and the cost can be reduced as compared to when the individual lead electrode 91 and the common lead electrode 92 are individually formed. Of course, the individual lead electrode 91 and the common lead electrode 92 may be formed of different layers.

The material of the individual lead electrode 91 and the common lead electrode 92 is not particularly limited as long as it is a conductive material, and for example, gold (Au), platinum (Pt), aluminum (Al), copper (Cu) or the like can be used. In the present embodiment, gold (Au) is used as the individual lead electrode 91 and the common lead electrode 92. Further, the individual lead electrode 91 and the common lead electrode 92 may have an adhesion layer for improving the adhesion with the first electrode 60, the second electrode 80, and the diaphragm 50.

The individual lead electrode 91 is provided for each active portion 310, that is, for each first electrode 60. The individual lead electrode 91 is coupled to the vicinity of the end portion 60*b* of the first electrode 60 in the −X direction provided on the outside of the piezoelectric body layer 70 via the wiring portion 85, and is drawn out on the top of the flow path forming substrate 10, actually to the top of the diaphragm 50 in the −X direction.

On the other hand, the common lead electrode 92 is drawn out in the −X direction from the top of the second electrode 80 constituting the common electrode on the piezoelectric body layer 70 to the top of the diaphragm 50, at both end portions in the Y-axis direction. Further, the common lead electrode 92 has an extension portion 93 extending along the Y-axis direction in an area corresponding to the end portion 12*b* of the pressure chamber 12 on the side of the −X direction. Further, the common lead electrode 92 includes an extension portion 94 extending along the Y-axis direction in an area corresponding to the end portion 12*a* of the pressure chamber 12 on the side of the +X direction. These extension portions 93 and 94 are continuously provided in the Y-axis direction with respect to the plurality of active portions 310. As described above, the common lead electrode 92 is drawn out at both end portions thereof in the Y-axis direction, to the top of the diaphragm 50 in the −X direction.

Further, the extension portions 93 and 94 extend from the inside of the pressure chamber 12 to the outside of the pressure chamber 12. In the present embodiment, the active portions 310 of the piezoelectric actuator 300 extend to the outside of the pressure chamber 12 at both end portions of the pressure chamber 12 in the X-axis direction, and the extension portions 93 and 94 extend to the outside of the pressure chamber 12 on the top of the active portion 310.

On the other hand, in the piezoelectric actuator 300 according to the present embodiment, when one area far from the end portion 80*b* of the second electrode 80 is a first area S1 and one area near the end portion 80*b* of the second electrode 80 is a second area S2, of two areas of the second electrode 80 in the X-axis direction, the piezoelectric body layer 70 of the first area S1 has (100) plane preferential orientation, and a (100) plane orientation ratio of the piezoelectric body layer 70 of the second area S2 is lower than a (100) plane orientation ratio of the piezoelectric body layer 70 of the first area S1.

In other words, the piezoelectric body layer 70 has a first orientation portion 75 having (100) plane preferential orientation in the first area S1, and a second orientation portion 76 having a (100) plane orientation ratio lower than that of the first orientation portion 75 in the second area S2.

Specifically, the first area S1 and the second area S2 are the following areas. The first area S1 is an area positioned in a driving area in which the diaphragm 50 is in contact with the pressure chamber 12 which is a recess portion. The second area S2 is an area positioned in a non-driving area in which the diaphragm 50 is not in contact with the pressure chamber 12. That is, the first area S1 is the area inside the pressure chamber 12, preferably in the vicinity of the center portion of the pressure chamber 12 in the X-axis direction, and the second area S2 is the area outside the end portion 12*b* of the pressure chamber 12 in the −X direction.

That is, the piezoelectric body layer 70 has the first orientation portion 75 having (100) plane preferential orientation in an area facing the pressure chamber 12, and has the second orientation portion 76 having a (100) plane orientation ratio lower than that of the first orientation portion 75 in an area outside the end portion 12*b* of the pressure chamber 12 in the −X direction. In the present embodiment, the piezoelectric body layer 70 is mainly constituted with the first orientation portion 75 having (100) plane preferential orientation, and has the second orientation portion 76 having a (100) plane orientation ratio lower than that of the first orientation portion 75 in a portion of the area outside the pressure chamber 12.

In addition, in the present specification, “having priority orientation” means that 50% or more, preferably 80% or more of crystals are oriented to a predetermined crystal plane. For example, “having (100) plane preferential orientation” includes not only when all the crystals are (100) plane-oriented, but also when more than half of the crystals (in other words, 50% or more, preferably 80% or more) are (100) plane-oriented.

Further, the second orientation portion 76 may have a (100) plane orientation ratio lower than that of the first orientation portion 75, and of course may have (100) plane orientation, but may not have (100) plane orientation. In the present embodiment, the second orientation portion 76 has (111) plane preferential orientation. That is, the piezoelectric body layer 70 of the second area S2 has (111) plane preferential orientation. Further, the second orientation portion 76 may have (110) plane preferential orientation. That is, the piezoelectric body layer 70 of the second area S2 may have (110) plane preferential orientation.

Further, as will be described in detail later, since the piezoelectric body layer 70 has the first orientation portion 75 and the second orientation portion 76, there is present a surface layer portion 700 in which the titanium content is different between the first orientation portion 75 and the second orientation portion 76 in the vicinity of the surface of the piezoelectric body layer 70 on the side of the first electrode 60. That is, the piezoelectric body layer 70 has the surface layer portion 700 having different titanium contents in the first area S1 and the second area S2 at least on the side of the first electrode 60.

Since the piezoelectric body layer 70 has the first orientation portion 75 and the second orientation portion 76 in this way, it is possible to suppress the heat generation of the piezoelectric body layer 70 while suppressing the inhibition of deformation of the piezoelectric actuator 300. The first orientation portion 75 having (100) plane preferential orientation has a relatively large piezoelectric strain when a voltage is applied. On the other hand, for example, in the second orientation portion 76, which has (111) plane preferential orientation and has a (100) plane orientation ratio lower than that of the first orientation portion 75, the piezoelectric strain when a voltage is applied to the piezoelectric actuator 300 is smaller than that of the first orientation portion 75. Accordingly, since the piezoelectric body layer 70 has the second orientation portion 76 in the area outside the pressure chamber 12, it is possible to suppress the heat generation of the piezoelectric body layer 70 while suppressing the inhibition of the deformation of the piezoelectric actuator 300.

It is preferable that the second orientation portion 76 is formed in a portion of the active portion 310 of the piezoelectric actuator 300, which is a non-flexible portion, that is, a portion that extends to the outside of the pressure chamber 12 in as wide a range as possible. Accordingly, the heat generation of the piezoelectric body layer 70 can be suppressed more effectively.

Further, it is preferable that the end portion **76*b* of the second orientation portion 76 on the side of the −X direction is positioned more outside compared to the end portion 80*b* of the second electrode 80 in the side of the −X direction. That is, it is preferable that the piezoelectric body layer 70 of the second area S2, which has a (100) orientation ratio lower than that of the piezoelectric body layer 70 of the first area S1, extends to the outside of the end portion 80*b* of the second electrode 80. Further, it is preferable that the end portion 76*b* of the second orientation portion 76 on the side of the −X direction is positioned at a position that is separated to a degree from the end portion 80*b* of the second electrode 80** on the side of the −X direction.

The end portion **80*b* of the second electrode 80 defines a boundary between the active portion 310 in which piezoelectric strain occurs and the inactive portion 320 in which piezoelectric strain does not occur, when a voltage is applied. Accordingly, in the vicinity of the end portion 80*b* of the second electrode 80, cracks or the like are likely to occur in the piezoelectric body layer 70 when a voltage is applied. However, since the second orientation portion 76 extends more outside compared to the end portion 80*b* of the second electrode 80, the piezoelectric strain of the active portion 310 can be suppressed to be small. Accordingly, it is possible to suppress the occurrence of cracks in the piezoelectric body layer 70 in the vicinity of the end portion 80*b* of the second electrode 80**.

Figure 6:
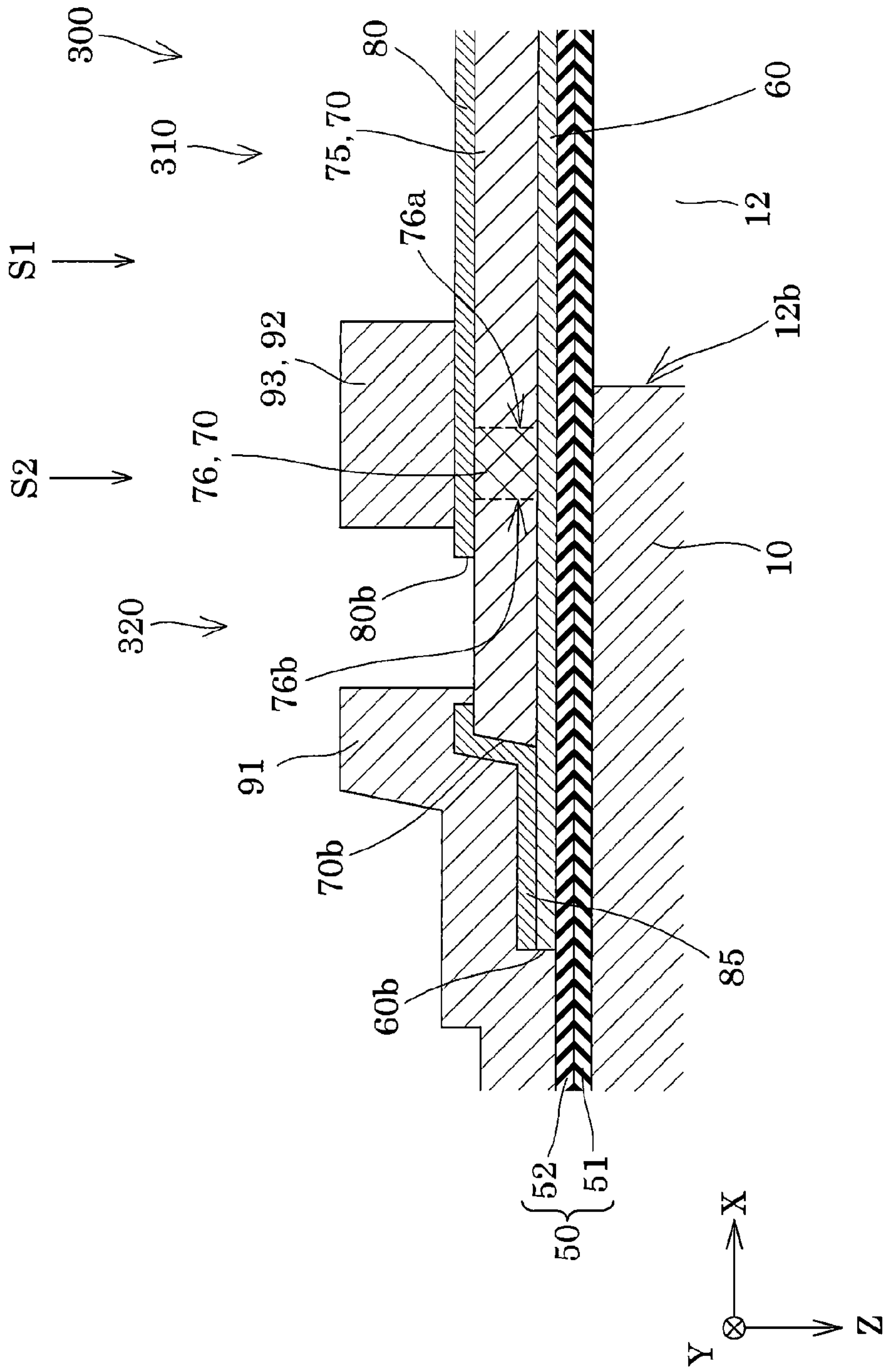
FIG. 6 is a sectional view of a main portion illustrating a modification example of the recording head according to the first embodiment.

Of course, as illustrated in FIG. 6, the end portion **76*b* of the second orientation portion 76 may be positioned on the side of the +X direction with respect to the end portion 80*b* of the second electrode 80. In such a configuration, the effect of suppressing the occurrence of cracks in the piezoelectric body layer 70 in the vicinity of the end portion 80*b* of the second electrode 80 may be low, but the effect of suppressing the heat generation in the piezoelectric body layer 70** can be obtained.

Figure 7:
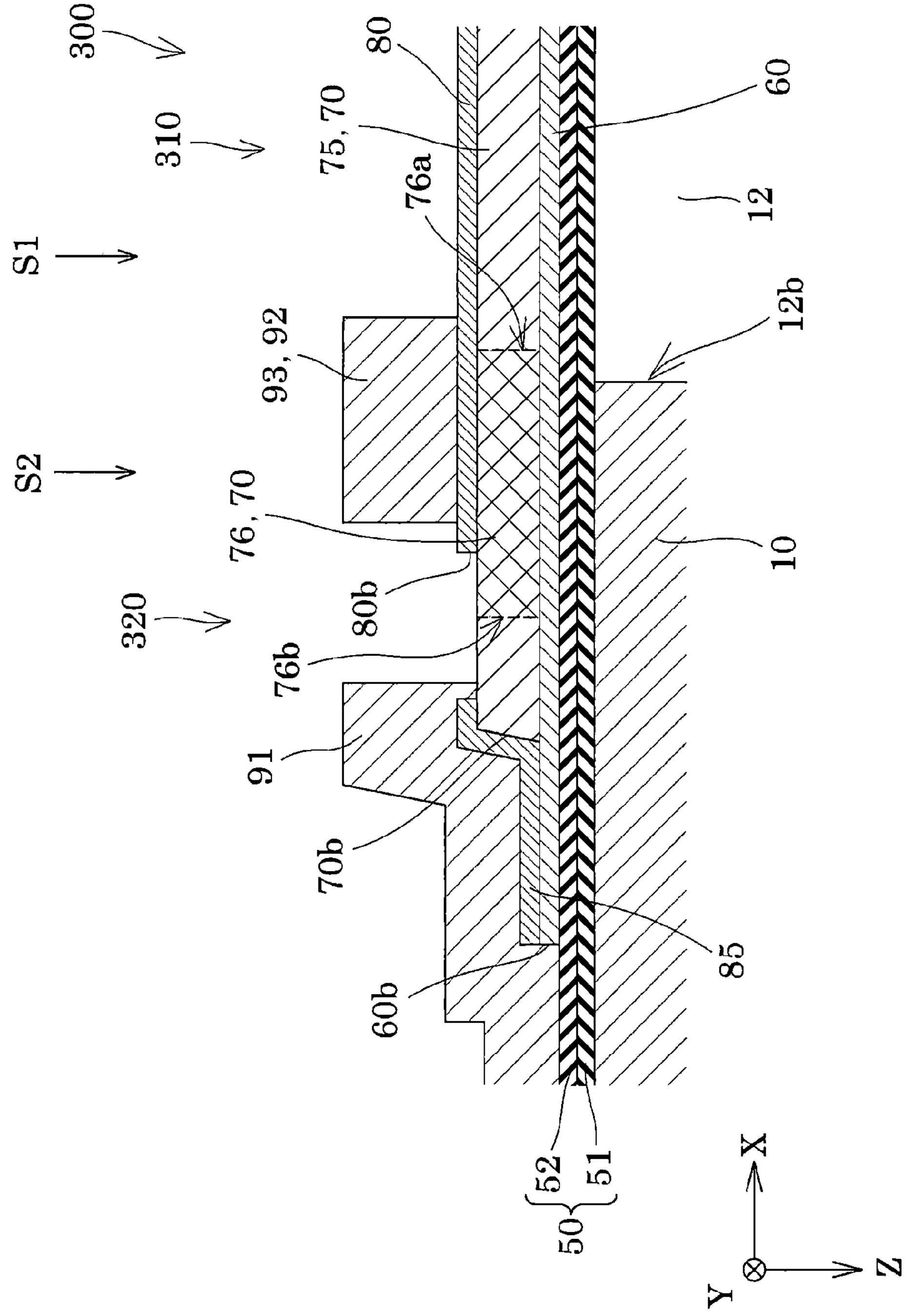
FIG. 7 is a sectional view of the main portion illustrating the modification example of the recording head according to the first embodiment.

On the other hand, the position of the end portion **76*a* of the second orientation portion 76 on the side of the +X direction is not particularly limited, but is preferably in the vicinity of the end portion 12*b* of the pressure chamber 12. Further, when it is in a range in which the amount of displacement of the piezoelectric actuator 300 due to voltage application can be secured, the end portion 76*a* of the second orientation portion 76 on the side of the +X direction may be positioned inside the pressure chamber 12 as illustrated in FIG. 7. By widening the range of the second orientation portion 76 as much as possible in this way, the heat generation of the piezoelectric body layer 70** can be further suppressed.

However, it is preferable that the end portion **76*a* of the second orientation portion 76 on the side of the +X direction, that is, the boundary between the first orientation portion 75 and the second orientation portion 76 is positioned within the area that faces the extension portion 93 formed on the second electrode 80. Since the magnitude of the piezoelectric strain when a voltage is applied differs between the first orientation portion 75 and the second orientation portion 76, cracks are likely to occur in the piezoelectric body layer 70 when a voltage is applied to the piezoelectric actuator 300, in the vicinity of the end portion 76*a* of the second orientation portion 76, which is the boundary between the first orientation portion 75 and the second orientation portion 76. However, when the end portion 76*a* of the second orientation portion 76 is in the area that faces the extension portion 93, since the displacement of the piezoelectric actuator 300 in the vicinity of the boundary between the first orientation portion 75 and the second orientation portion 76, is regulated by the extension portion 93, the occurrence of cracks in the piezoelectric body layer 70** can be suppressed.

The portion of the piezoelectric body layer 70 more outside compared to the second orientation portion 76, that is, the portion on the side of the −X direction is the first orientation portion 75 in the present embodiment. However, the orientation of the portion of the piezoelectric body layer 70 is not particularly limited. Since the portion of the piezoelectric body layer 70 further on the side of the −X direction than the second orientation portion 76 is the inactive portion 320 in which the second electrode 80 is not formed, heat is not generated when a voltage is applied. Accordingly, the portion may of course be the second orientation portion 76, and the (100) plane orientation ratio may be different from that of the first orientation portion 75 and the second orientation portion 76.

Next, an example of a method of manufacturing the ink jet recording head 1 according to the present embodiment, particularly an example of a method of manufacturing the piezoelectric actuator 300 will be described. FIGS. 8 to 19 are sectional views illustrating a method of manufacturing an ink jet recording head.

Figure 8:
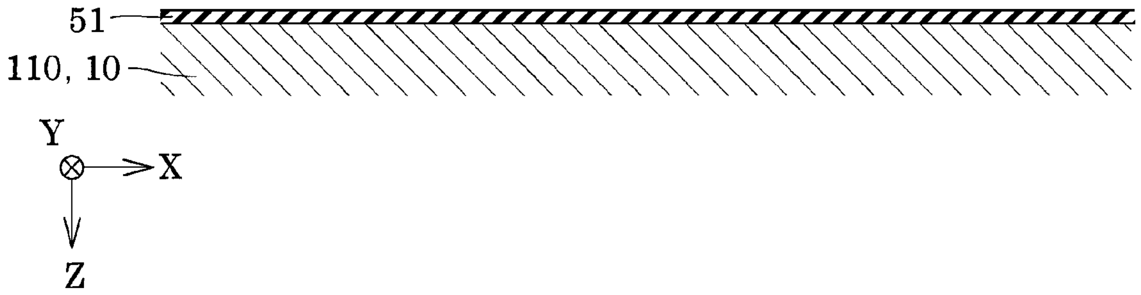
FIG. 8 is a sectional view illustrating a method of manufacturing the recording head according to the first embodiment.

First, as illustrated in FIG. 8, the elastic film 51 is formed on the surface of a flow path forming substrate wafer 110, which is a silicon wafer. In the present embodiment, the elastic film 51 made of silicon dioxide is formed by thermally oxidizing the flow path forming substrate wafer 110. Of course, the material of the elastic film 51 is not limited to silicon dioxide, and may be a silicon nitride film, a polysilicon film, an organic film (polyimide, parylene, or the like) or the like. The method of forming the elastic film 51 is not limited to thermal oxidation, and the elastic film 51 may be formed by a sputtering method, a CVD method, a spin coating method, or the like.

Figure 9:
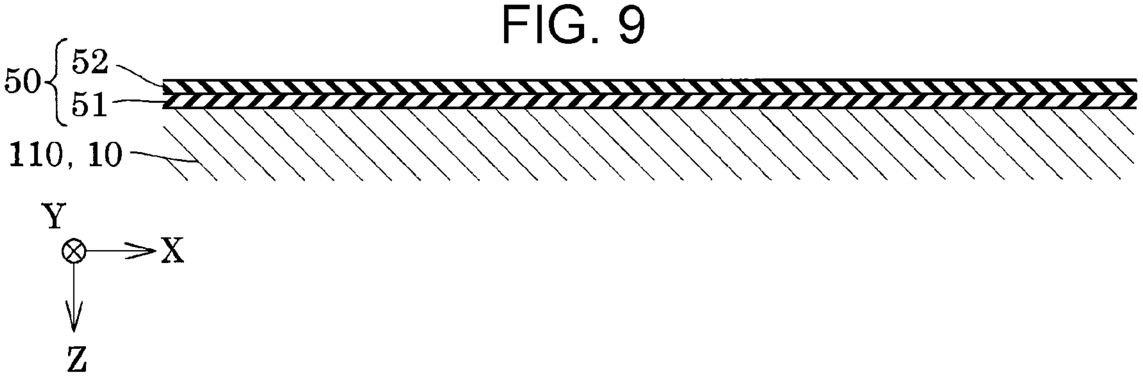
FIG. 9 is a sectional view illustrating the method of manufacturing the recording head according to the first embodiment.

Next, as illustrated in FIG. 9, the insulator film 52 made of zirconium oxide is formed on the elastic film 51. The insulator film 52 is not limited to zirconium oxide, but titanium oxide ($TiO_2$), aluminum oxide ($Al_2O_3$), hafnium oxide ($HfO_2$), magnesium oxide (MgO), lantern aluminate ($LaAlO_3$) or the like may be used. Examples of the method of forming the insulator film 52 include a sputtering method, a CVD method, a vapor deposition method, or the like. In the present embodiment, the diaphragm 50 is formed by the elastic film 51 and the insulator film 52, but only one of the elastic film 51 and the insulator film 52 may be provided as the diaphragm 50.

Figure 10:
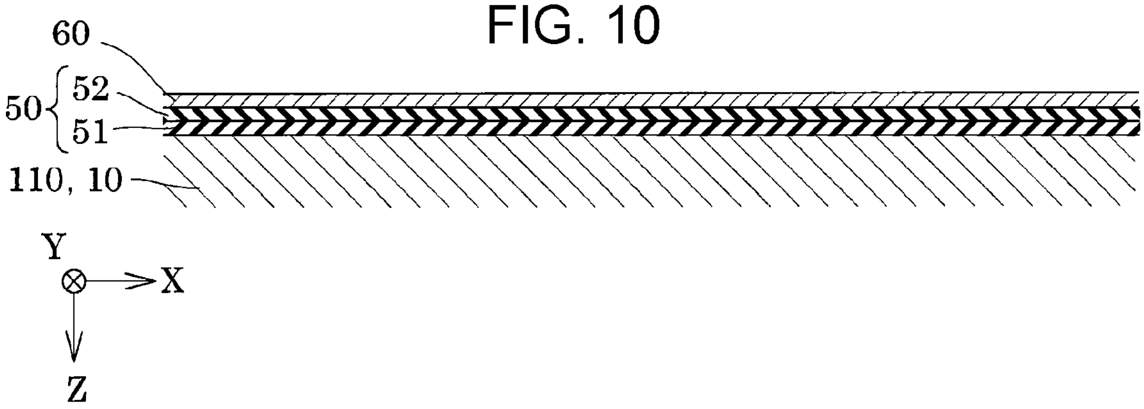
FIG. 10 is a sectional view illustrating the method of manufacturing the recording head according to the first embodiment.

Next, as illustrated in FIG. 10, the first electrode 60 is formed on the entire surface of the insulator film 52. The material of the first electrode 60 is not particularly limited, but when lead zirconate titanate (PZT) is used as the piezoelectric body layer 70, it is desirable that the material has little change in conductivity due to the diffusion of lead oxide. Accordingly, platinum, iridium, or the like is preferably used as the material for the first electrode 60. Further, the first electrode 60 can be formed by, for example, a sputtering method, a PVD method (physical vapor deposition method), or the like.

Figure 11:
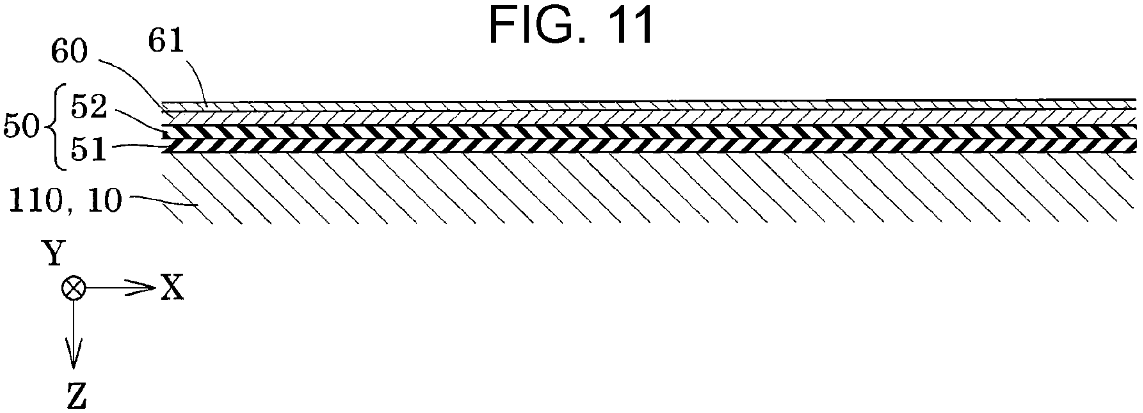
FIG. 11 is a sectional view illustrating the method of manufacturing the recording head according to the first embodiment.

Next, as illustrated in FIG. 11, a crystal seed layer 61 made of titanium (Ti) as an orientation control layer is formed on the first electrode 60. The crystal seed layer 61 may be formed in a layered shape or may be formed in an island shape.

At that time, a crystal seed layer 61*a* at the position corresponding to the first orientation portion 75 and a crystal seed layer 61*b* at the position on which the second orientation portion 76 is to be formed are formed with different thicknesses. That is, the crystal seed layer 61*a* at the position corresponding to the first orientation portion 75 is formed to have a thickness, for example, in the range of approximately 1 to 200 nm, or preferably formed with a predetermined thickness in the range of approximately 5 to 20 nm so that the first orientation portion 75 has the (100) plane preferential orientation, and the crystal seed layer 61*b* at the position on which the second orientation portion 76 is to be formed is formed to have a thickness different from that of the crystal seed layer 61*a*.

Figure 12:
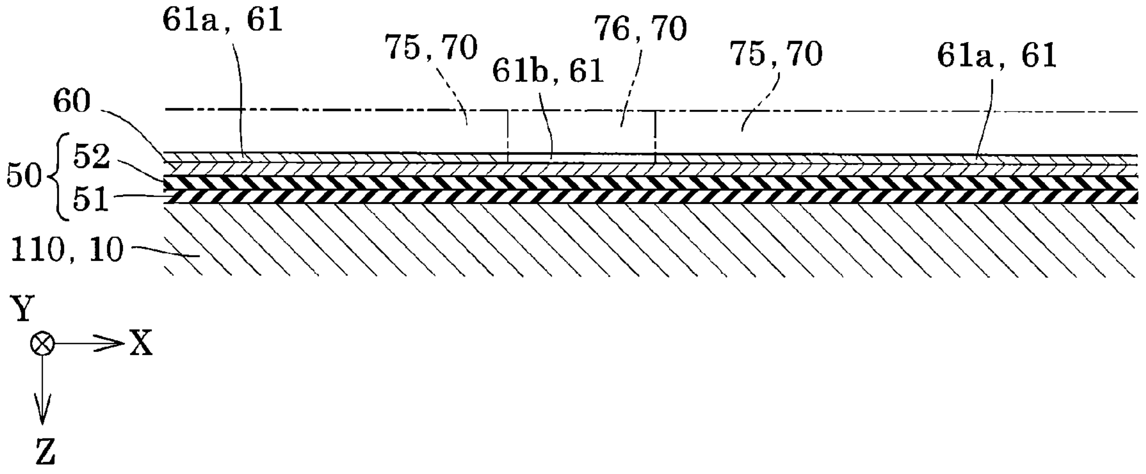
FIG. 12 is a sectional view illustrating the method of manufacturing the recording head according to the first embodiment.

When the second orientation portion 76 having (111) plane preferential orientation is formed in the present embodiment, the crystal seed layer 61 formed on the first electrode 60 is patterned by etching or the like, such that as illustrated in FIG. 12, the crystal seed layer 61*b* at the position in which the second orientation portion 76 is to be formed is removed, or the thickness of the crystal seed layer 61*b* at the position in which the second orientation portion 76 is to be formed is made thinner than the crystal seed layer 61*a* at the position in which the first orientation portion 75 is to be formed. FIG. 12 illustrates the positions in which the first orientation portion 75 and the second orientation portion 76 are formed by virtual lines. In the present embodiment, the crystal seed layer 61*b* is substantially removed, and the crystal seed layer 61 in the other area including the crystal seed layer 61*a* is left as it is at a predetermined thickness. The etching method of the crystal seed layer 61 is not particularly limited, and may be, for example, one by an etching solution or dry etching such as ion milling.

In the crystal seed layer 61*a* formed with a predetermined thickness, when the piezoelectric body layer 70 is formed in a later step, the preferential orientation direction of the piezoelectric body layer 70 can be controlled to (100), and the first orientation portion 75 of the piezoelectric body layer 70 suitable as an electromechanical conversion element can be obtained. On the other hand, in the crystal seed layer 61*b* that is removed or left thin, the piezoelectric body layer 70 grows under the influence of the first electrode 60, which is a base layer, when the piezoelectric body layer 70 is formed in a later step. Since the first electrode 60, which is the base layer, is made of platinum or the like and has (111) plane preferential orientation, the second orientation portion 76 is influenced by the first electrode 60 and has (111) plane preferential orientation.

Here, the crystal seed layer 61 functions as a seed that promotes crystallization when the piezoelectric body layer 70 crystallizes, and diffuses into the piezoelectric body layer 70 after calcination of the piezoelectric body layer 70. Accordingly, the piezoelectric body layer 70 has the surface layer portion 700 having different titanium contents in the first orientation portion 75 and the second orientation portion 76 in the vicinity of the surface on the side of the first electrode 60, for example, in the range of approximately 20 nm to 30 nm. That is, the piezoelectric body layer 70 has the surface layer portion 700 having different titanium contents in the first area S1 and the second area S2 on the side of the first electrode 60 (see FIG. 4).

Specifically, the titanium content of a surface layer portion 700*b* formed in the second orientation portion 76 having (111) plane preferential orientation is lower than the titanium content of a surface layer portion 700*a* of the first orientation portion 75 having (100) plane preferential orientation. That is, the titanium content of the surface layer portion 700*b* in the second area S2 is lower than the titanium content of the surface layer portion 700*a* in the first area S1.

That is, the first orientation portion 75, as a result of having (100) plane preferential orientation, has the surface layer portion 700*a* containing a predetermined amount of titanium, and the second orientation portion 76, as a result of having (111) plane preferential orientation, has the surface layer portion 700*b* having a titanium content lower than that of the surface layer portion 700*a* of the first orientation portion 75. "The content of titanium is low" is a relative rule, and the surface layer portion 700*b* of the second orientation portion 76 may not have to contain titanium.

In addition, unlike the present embodiment, when the second orientation portion 76 having (110) plane preferential orientation is formed, the thickness of the crystal seed layer 61*b* at the position corresponding to the second orientation portion 76 is made thicker than the thickness of the crystal seed layer 61*a* at the position corresponding to the first orientation portion 75. For example, the crystal seed layer 61 formed on the first electrode 60 is patterned by etching or the like to temporarily remove the crystal seed layer 61*a* at the position corresponding to the first orientation portion 75. Then, the crystal seed layer 61 made of titanium (Ti) is re-formed on the first electrode 60 with a predetermined thickness. As a result, the crystal seed layer 61*a* at the position corresponding to the first orientation portion 75 has an appropriate thickness, and the crystal seed layer 61*b* at the position facing the second orientation portion 76 is thicker than the crystal seed layer 61*a*.

Even in this case, in the portion of the crystal seed layer 61*a* provided with a predetermined thickness, when the piezoelectric body layer 70 is formed in a later step, the preferential orientation direction of the piezoelectric body layer 70 can be controlled to (100), and the first orientation portion 75 of the piezoelectric body layer 70 suitable as an electromechanical conversion element can be obtained. On the other hand, in the portion of the crystal seed layer 61*b* formed thicker than the crystal seed layer 61*a*, when the piezoelectric body layer 70 is formed in a later step, the piezoelectric body layer 70 grows freely, and the second orientation portion 76 has (110) plane preferential orientation.

Further, also in this case, the piezoelectric body layer 70 has a surface layer portion 700 having different titanium contents between the first orientation portion 75 and the second orientation portion 76 in the vicinity of the surface on the side of the first electrode 60. Then, the titanium content of the surface layer portion 700*b* of the second orientation portion 76 having (110) plane preferential orientation is higher than the titanium content of the surface layer portion 700*a* of the first orientation portion 75. That is, the titanium content of the surface layer portion 700*b* in the second area S2 is higher than the titanium content of the surface layer portion 700*b* in the first area S1.

In other words, the first orientation portion 75, as a result of having (100) plane preferential orientation, has the surface layer portion 700*a* containing a predetermined amount of titanium, and the second orientation portion 76, as a result of having (110) plane preferential orientation, has the surface layer portion 700*b* having a titanium content higher than that of the surface layer portion 700*a* of the first orientation portion 75.

Next, the piezoelectric body layer 70 made of lead zirconate titanate (PZT) is formed. In the present embodiment, a so-called sol-gel method is used to form the piezoelectric body layer 70, in which a so-called sol in which a metal complex is dissolved and dispersed in a solvent is applied, dried, gelled, and then calcined at a high temperature to obtain the piezoelectric body layer 70 made of a metal oxide. The method of manufacturing the piezoelectric body layer 70 is not limited to the sol-gel method, and for example, a liquid phase film forming method such as a MOD method, or a vapor phase film deposition method such as a sputtering method, a physical vapor deposition method (PVD method), and a laser ablation method may be used.

Figure 13:
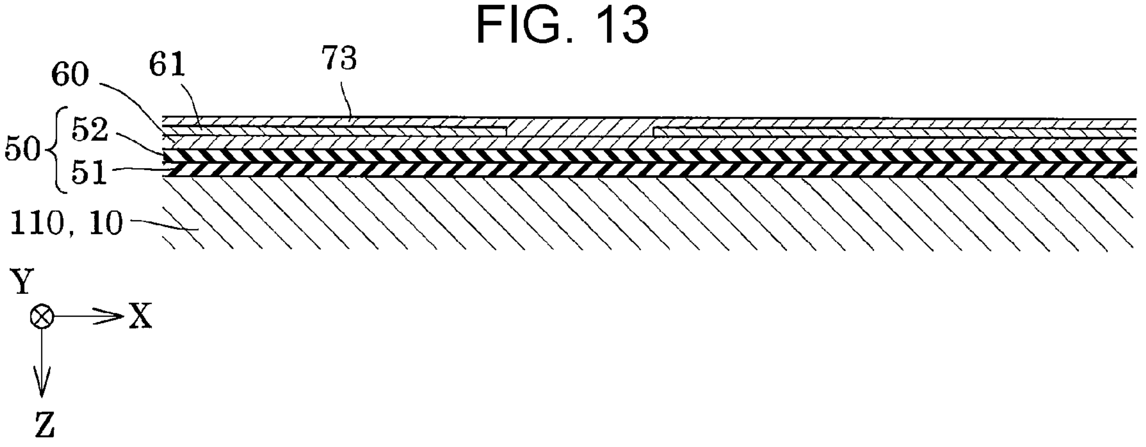
FIG. 13 is a sectional view illustrating the method of manufacturing the recording head according to the first embodiment.

As a specific procedure for forming the piezoelectric body layer 70, first, as illustrated in FIG. 13, a piezoelectric body precursor film 73, which is a PZT precursor film, is formed on the first electrode 60 on which the crystal seed layer 61 is formed. That is, a sol (solution) containing a metal complex is coated on the flow path forming substrate wafer 110 on which the first electrode 60 (crystal seed layer 61) is formed (coating step). Next, the piezoelectric body precursor film 73 is heated to a predetermined temperature and dried for a predetermined period of time (drying step). For example, in the present embodiment, the piezoelectric body precursor film 73 can be dried by being held at 170 to 180° C. for 8 to 30 minutes.

Next, the dried piezoelectric body precursor film 73 is degreased by being heated to a predetermined temperature and being held for a predetermined period of time (degreasing step). For example, in the present embodiment, the piezoelectric body precursor film 73 is degreased by being heated to a temperature of approximately 300 to 400° C. and being held for substantially 10 to 30 minutes. The degreasing referred to here is to remove the organic component contained in the piezoelectric body precursor film 73 as, for example, $NO_2$, $CO_2$, $H_2O$ or the like.

Figure 14:
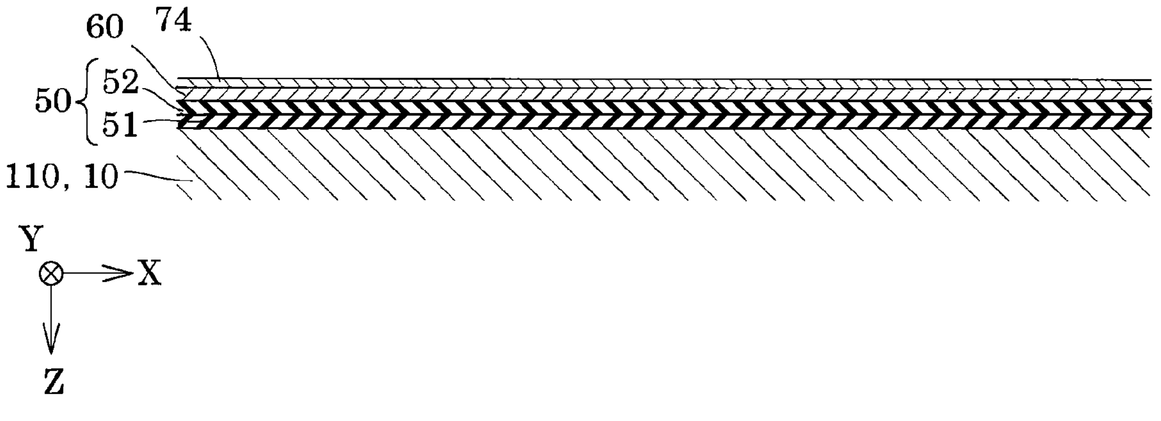
FIG. 14 is a sectional view illustrating the method of manufacturing the recording head according to the first embodiment.

Next, as illustrated in FIG. 14, the piezoelectric body precursor film 73 is heated to a predetermined temperature and held for a predetermined period of time to be crystallized to form a piezoelectric body film 74 (calcination step). In the calcination step, it is preferable to heat the piezoelectric body precursor film 73 to 700° C. or higher. In the calcination step, it is preferable that the temperature rising rate is 50° C./sec or more. As a result, the piezoelectric body film 74 having excellent characteristics can be obtained.

As the heating apparatus used in such a drying step, a degreasing step, and a calcination step, for example, a hot plate, a rapid thermal processing (RTP) apparatus that heats by irradiation with an infrared lamp, or the like can be used.

Figure 15:
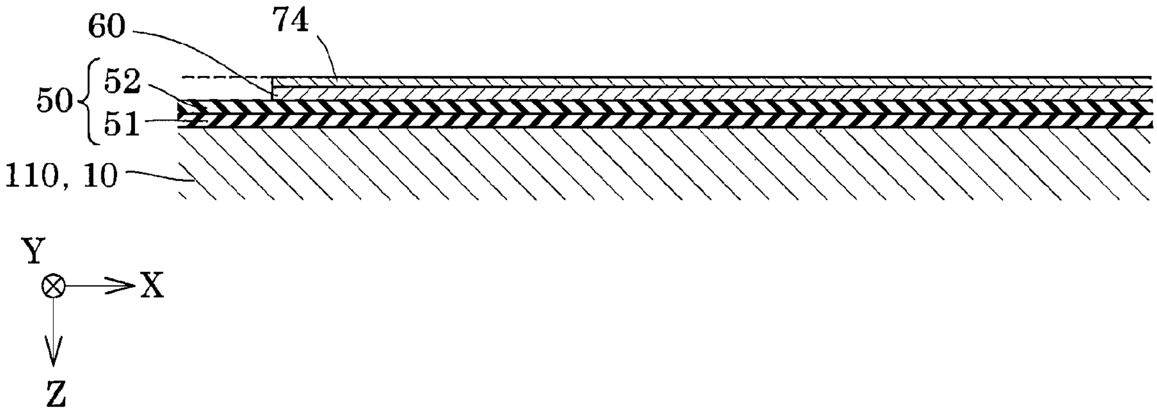
FIG. 15 is a sectional view illustrating the method of manufacturing the recording head according to the first embodiment.

Next, as illustrated in FIG. 15, at the step in which the piezoelectric body film 74 of the first layer is formed on the first electrode 60, the first electrode 60 and the piezoelectric body film 74 of the first layer are simultaneously patterned. The patterning of the first electrode 60 and the piezoelectric body film 74 of the first layer can be performed by dry etching such as ion milling, for example.

Here, for example, when the first electrode 60 is patterned and then the piezoelectric body film 74 of the first layer is formed, the first electrode 60 is patterned by a photo step, ion milling, and ashing, and thus the surface of the first electrode 60 is altered. Then, although the piezoelectric body film 74 is formed on the altered surface, the crystallinity of the piezoelectric body film 74 is not good, and the piezoelectric body film 74 of the second and subsequent layers also influences the crystalline state of the piezoelectric body film 74 of the first layer and undergoes the crystal growth, and thus the piezoelectric body layer 70 having good crystallinity cannot be formed.

On the other hand, when the piezoelectric body film 74 of the first layer is formed and then patterned at the same time as the first electrode 60, the piezoelectric body film 74 of the first layer has strong properties as a seed for satisfactory crystal growth of the piezoelectric body film 74 of the second and subsequent layers compared to the first electrode 60 or the like, and although an extremely thin altered layer is formed on the surface layer by the patterning, it does not significantly affect the crystal growth of the piezoelectric body films 74 of the second and subsequent layers.

Figure 16:
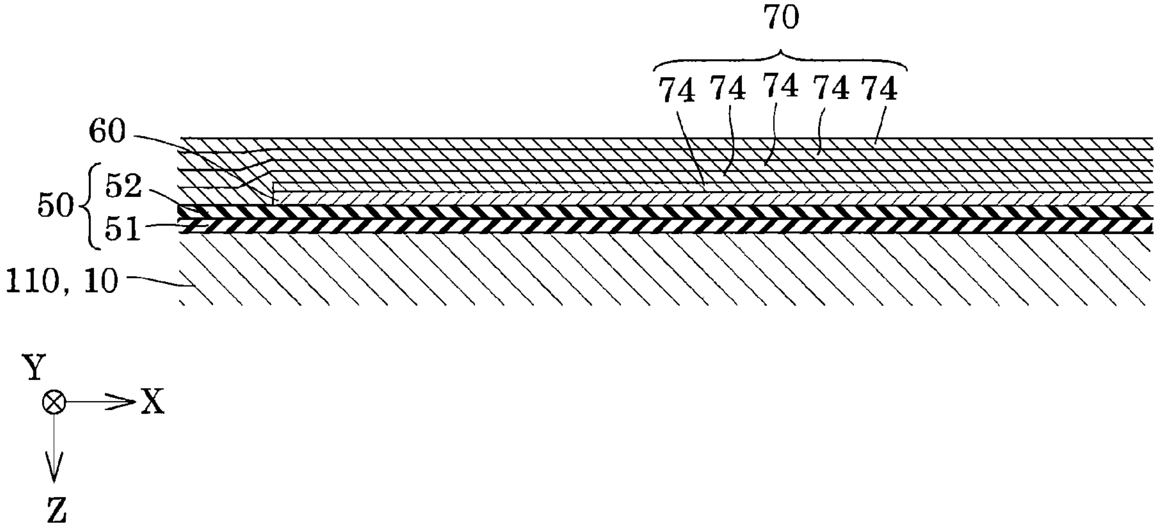
FIG. 16 is a sectional view illustrating the method of manufacturing the recording head according to the first embodiment.

Next, as illustrated in FIG. 16, the piezoelectric body layer 70 constituted with the plurality of piezoelectric body films 74 is formed by repeating the above-mentioned piezoelectric body film forming step including the coating step, the drying step, the degreasing step, and the calcination step a plurality of times.

Figure 17:
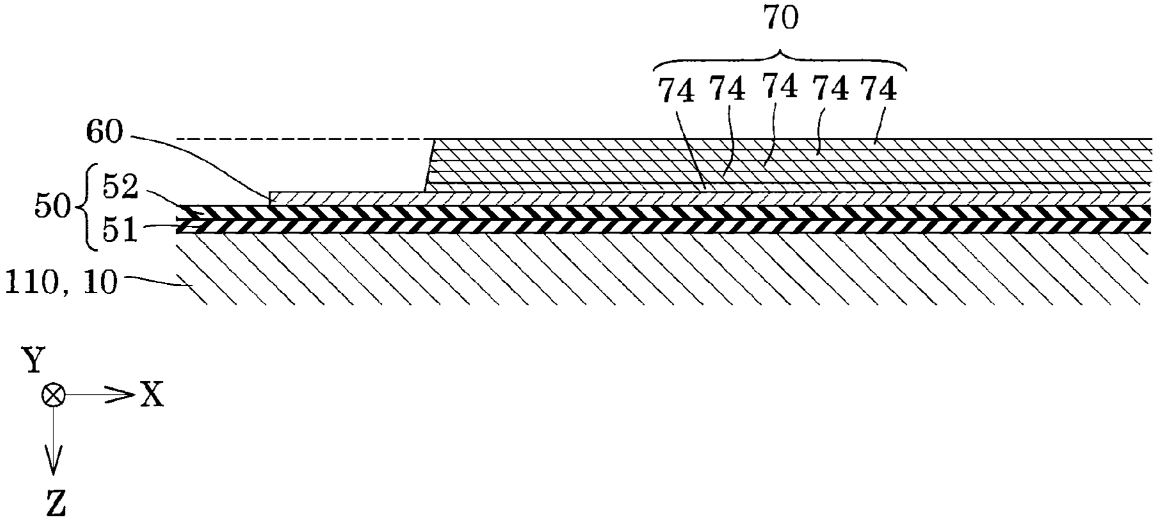
FIG. 17 is a sectional view illustrating the method of manufacturing the recording head according to the first embodiment.

Next, as illustrated in FIG. 17, the piezoelectric body layer 70 is patterned to correspond to each pressure chamber 12. In the present embodiment, a mask (not illustrated) formed in a predetermined shape is provided on the piezoelectric body layer 70, and the piezoelectric body layer 70 is etched through the mask, that is, patterning is performed by so-called photolithography. The patterning of the piezoelectric body layer 70 includes, for example, dry etching such as reactive ion etching and ion milling.

Figure 18:
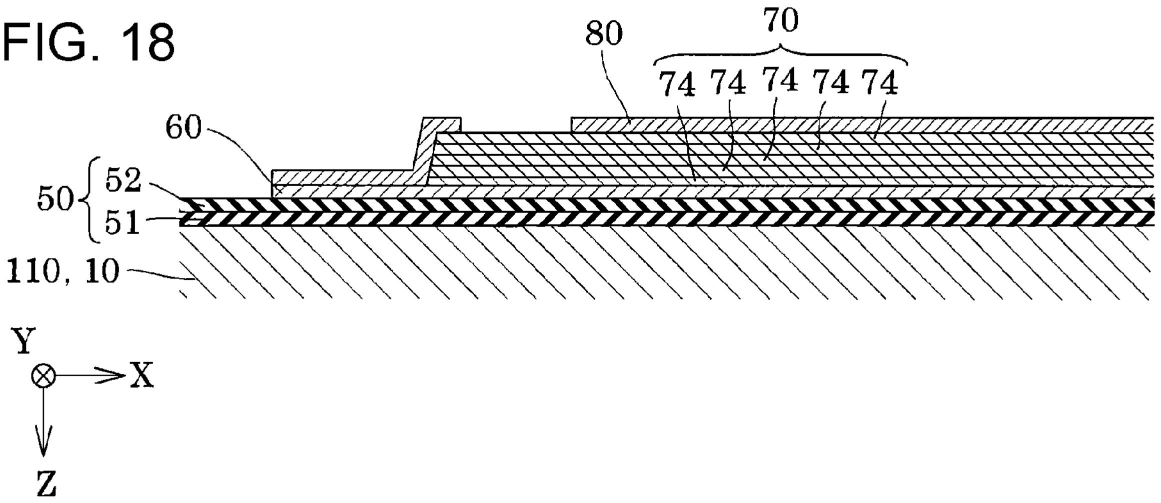
FIG. 18 is a sectional view illustrating the method of manufacturing the recording head according to the first embodiment.
Figure 19:
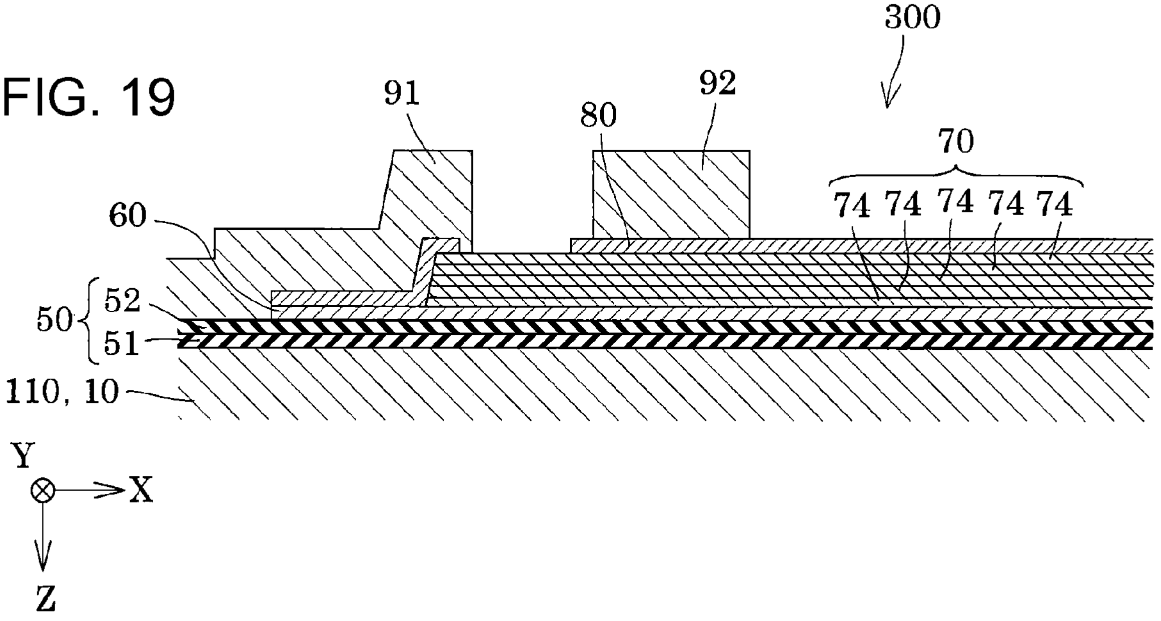
FIG. 19 is a sectional view illustrating the method of manufacturing the recording head according to the first embodiment.

Next, as illustrated in FIG. 18, the second electrode 80 made of, for example, iridium (Ir) is formed over the piezoelectric body layer 70 and the insulator film 52, and the second electrode 80 is patterned into a predetermined shape. Further, as illustrated in FIG. 19, the individual lead electrode 91 and the common lead electrode 92 are formed on the flow path forming substrate wafer 110. As a result, the piezoelectric actuator 300 is formed.

Although not illustrated in regard to the subsequent steps, after bonding the protective substrate wafers, which are silicon wafers and are to be a plurality of protective substrates 30, to the side of the piezoelectric actuator 300 of the flow path forming substrate wafer 110, the flow path forming substrate wafer 110 is thinned to a predetermined thickness. Further, the pressure chamber 12 partitioned by the partition wall 11 is formed by anisotropic etching (wet etching) the flow path forming substrate wafer 110 using an alkaline solution such as KOH via a mask film patterned in a predetermined shape.

Further, the unnecessary portion of the outer peripheral edge portion of the flow path forming substrate wafer 110 and the protective substrate wafer is removed by cutting, for example, by dicing or the like. The bonded body of the flow path forming substrate wafer 110 and the protective substrate wafer is divided into the flow path forming substrate 10 or the like of one chip size as illustrated in FIG. 1. The recording head 1 of the present embodiment is manufactured by bonding the communication plate 15, the nozzle plate 20, the case member 40, the compliance substrate 45, or the like to the bonded body of the protective substrate 30 and the flow path forming substrate 10.

As described above, in the ink jet recording head 1 according to the present embodiment, the piezoelectric body layer 70 in the first area S1 has (100) plane preferential orientation, and the (100) plane orientation ratio of the piezoelectric body layer 70 in the second area S2 is lower than the (100) plane orientation ratio of the piezoelectric body layer 70 in the first area S1. More specifically, in the recording head 1, the piezoelectric body layer 70 has the first orientation portion 75 having (100) plane preferential orientation in the first area S1, and has the second orientation portion 76 having (111) plane preferential orientation in the second area S2. As a result, it is possible to suppress the heat generation of the piezoelectric body layer 70 while suppressing the inhibition of the deformation of the piezoelectric actuator 300.

Further, in the present embodiment, as a step of forming the piezoelectric actuator 300, there is a step of forming the crystal seed layer 61 which is an orientation control layer for controlling the crystal orientation of the piezoelectric body layer 70, and in the step of forming the crystal seed layer 61, the crystal seed layer 61 is formed to have different thicknesses in the first area S1 and the second area S2. That is, the crystal seed layer 61 is formed to have different thicknesses in the first orientation portion 75 and the second orientation portion 76. Specifically, as described above, the thickness of the crystal seed layer 61 at the position corresponding to the second orientation portion 76 is made thinner than the thickness of the crystal seed layer 61 at the position corresponding to the first orientation portion 75. As a result, the first orientation portion 75 can be made to be (100) plane preferential orientation, and the second orientation portion 76 can be made to be (111) plane preferential orientation.

On the other hand, in the present embodiment, when the piezoelectric body layer 70 is formed, by adjusting the thickness of the crystal seed layer 61 as the orientation control layer formed on the first electrode 60, the orientation of the piezoelectric body layer 70, that is, the orientation of the first orientation portion 75 and the second orientation portion 76 is controlled, but the orientation of the piezoelectric body layer 70 can also be controlled by adjusting the thickness of the so-called intermediate crystal seed layer.

Figure 20:
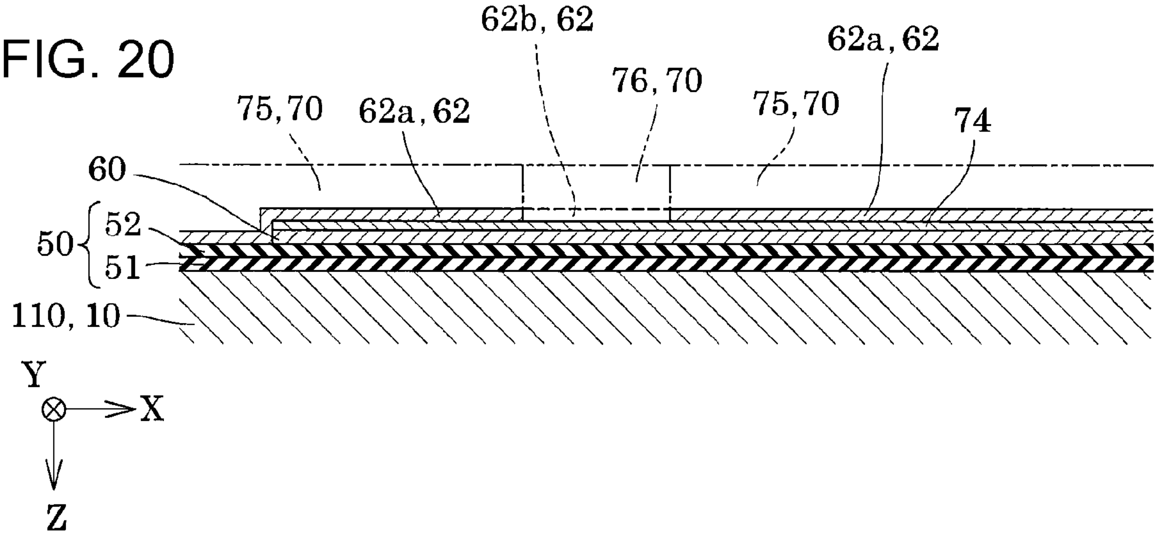
FIG. 20 is a sectional view illustrating another example of the method of manufacturing a recording head according to the first embodiment.

After patterning the piezoelectric body film 74 of the first layer and the first electrode 60 (see FIG. 15), the intermediate crystal seed layer 62, as illustrated in FIG. 20, is formed over on the insulator film 52, on the side surface of the first electrode 60, the side surface of the piezoelectric body film 74 of the first layer, and on the piezoelectric body film 74. Similar to the crystal seed layer 61, the intermediate crystal seed layer 62 preferably uses titanium, and is formed in a layered shape or an island shape. After that, the piezoelectric body film 74 of the second and subsequent layers is formed in a similar manner as in the embodiment described above (see FIGS. 16 to 19).

The orientation of the piezoelectric body film 74 of the second and subsequent layers can also be controlled by the intermediate crystal seed layer 62. Similar to the case of the crystal seed layer 61 described above, the thickness of the intermediate crystal seed layer 62*b* at the position corresponding to the second orientation portion 76 is made thinner than the thickness of the intermediate crystal seed layer 62*a* at the position corresponding to the first orientation portion 75 (see FIG. 20). As a result, the first orientation portion 75 can be made to be (100) plane preferential orientation, and the second orientation portion 76 can be made to be (111) plane preferential orientation. When the intermediate crystal seed layer 62 is formed, there is present the surface layer portion 700 having different titanium contents in the first orientation portion 75 and the second orientation portion 76 in the vicinity of the surface of the piezoelectric body layer 70 on the side of the first electrode 60.

When the intermediate crystal seed layer 62 is formed, the crystal seed layer 61 may not be formed, or the crystal seed layer 61 may be formed together with the intermediate crystal seed layer 62. When the crystal seed layer 61 is formed together with the intermediate crystal seed layer 62, the thickness of the crystal seed layer 61 may be substantially uniform over the entire thickness.

Second Embodiment

Figure 21:
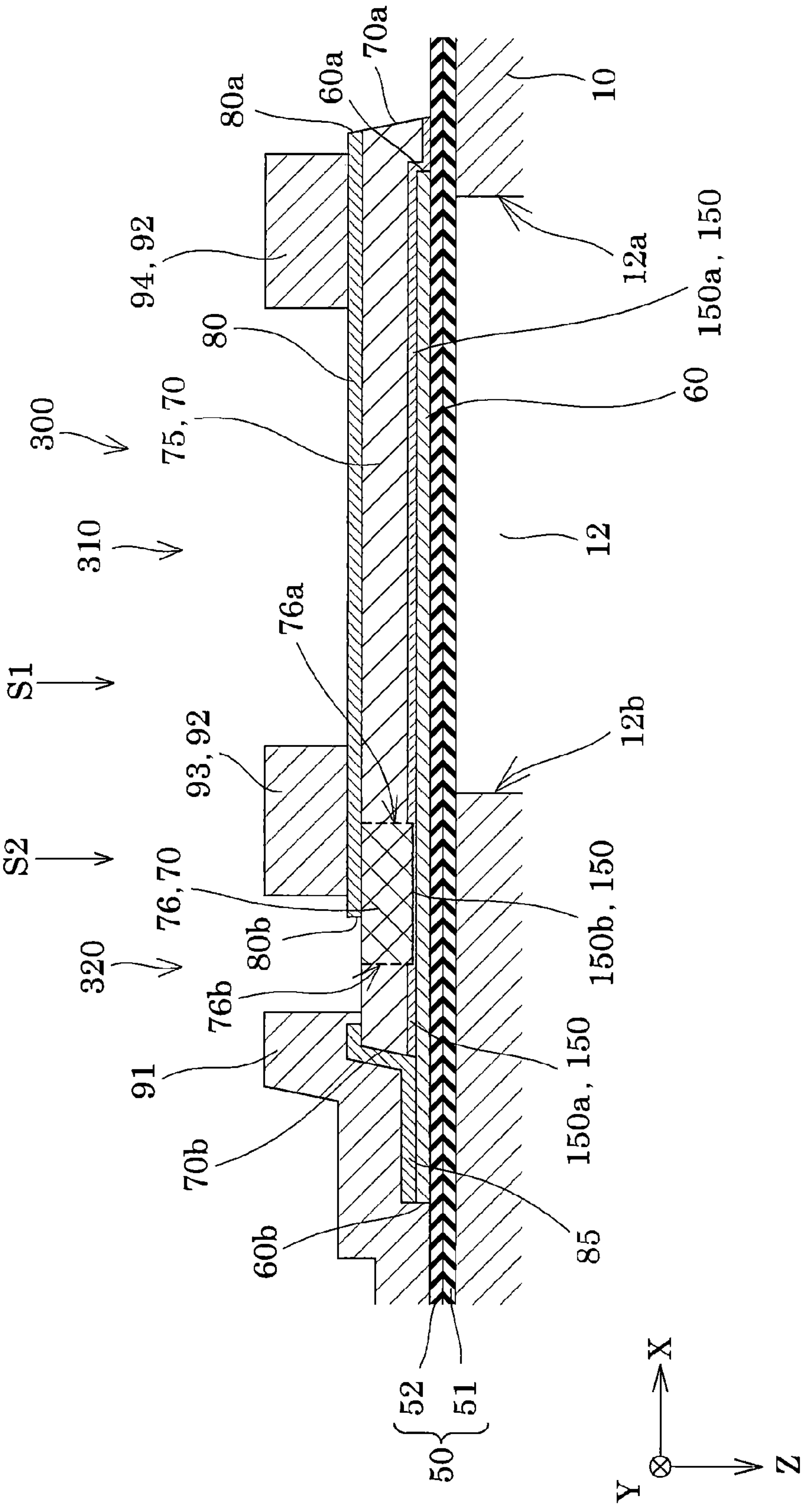
FIG. 21 is a sectional view of a main portion of a recording head according to a second embodiment.

FIG. 21 is a sectional view of an ink jet recording head according to the present embodiment. The same members are designated by the same reference numerals, and redundant descriptions will be omitted.

In the first embodiment described above, the crystal seed layer 61 made of titanium as an orientation control layer is formed at the time of manufacturing the piezoelectric actuator 300, and as a result, the surface layer portion 700 containing titanium is present in the piezoelectric body layer. In the present embodiment, since the crystal seed layer 61 is not formed at the time of manufacturing the piezoelectric actuator 300, the surface layer portion 700 containing titanium is not present.

In the ink jet recording head 1 according to the present embodiment, as illustrated in FIG. 21, an orientation layer 150 as an orientation control layer is provided between the first electrode 60 and the piezoelectric body layer 70. The orientation layer 150 is composed of at least one selected from $LaNi_yO_x$, $SrRu_yO_x$, $(Ba,Sr)Ti_yO_x$, and $(Bi,Fe)Ti_yO_x$, and preferably consists of $LaNi_yO_x$.

Further, the length of the orientation layer 150 in the Z-axis direction in the second area S2 is shorter than the length of the orientation layer 150 in the Z-axis direction in the first area S1. That is, the orientation layer 150 corresponding to the first orientation portion 75 of the piezoelectric body layer 70 is formed to have a predetermined thickness, and the thickness of an orientation layer 150*b* at the position corresponding to the second orientation portion 76 is thinner than the thickness of an orientation layer 150*a* at the position corresponding to the first orientation portion 75.

By forming the piezoelectric body layer 70 on the orientation layer 150 having a predetermined thickness, the preferential orientation direction of the piezoelectric body layer 70 can be controlled to (100), and the piezoelectric body layer 70 suitable as an electromechanical conversion element can be obtained. Accordingly, the first orientation portion 75 having (100) plane preferential orientation is formed on the orientation layer 150 having a predetermined thickness. On the other hand, when the piezoelectric body layer 70 is formed on the orientation layer 150 formed thinner than the portion corresponding to the first orientation portion 75, the piezoelectric body layer 70 grows under the influence of the first electrode 60 which is the base layer. The first electrode 60, which is the base layer, is made of, for example, platinum or the like and has (111) plane preferential orientation. Accordingly, the second orientation portion 76 having (111) plane preferential orientation is formed on the orientation layer 150 formed thinner than the portion corresponding to the first orientation portion 75.

The orientation layer 150 may be formed in a similar procedure as the crystal seed layer 61. Specifically, after forming the orientation layer 150 on the entire surface of the first electrode 60, the orientation layer 150 may be patterned by etching or the like to remove the orientation layer 150*b* at the position corresponding to the second orientation portion 76, or the thickness of the orientation layer 150*b* may be made thinner than the thickness of the orientation layer 150 at the position corresponding to the first orientation portion 75. The etching method of the orientation layer 150 is not particularly limited, and may be, for example, one by an etching solution or dry etching such as ion milling.

Further, the orientation layer 150 according to the present embodiment remains as a layer without being diffused into the piezoelectric body layer 70. The thickness of the orientation layer 150 is not particularly limited, but is preferably approximately from 5 nm to 20 nm. As a result, the first orientation portion 75 can be satisfactorily made to be (100) plane preferential orientation.

Third Embodiment

Figure 22:
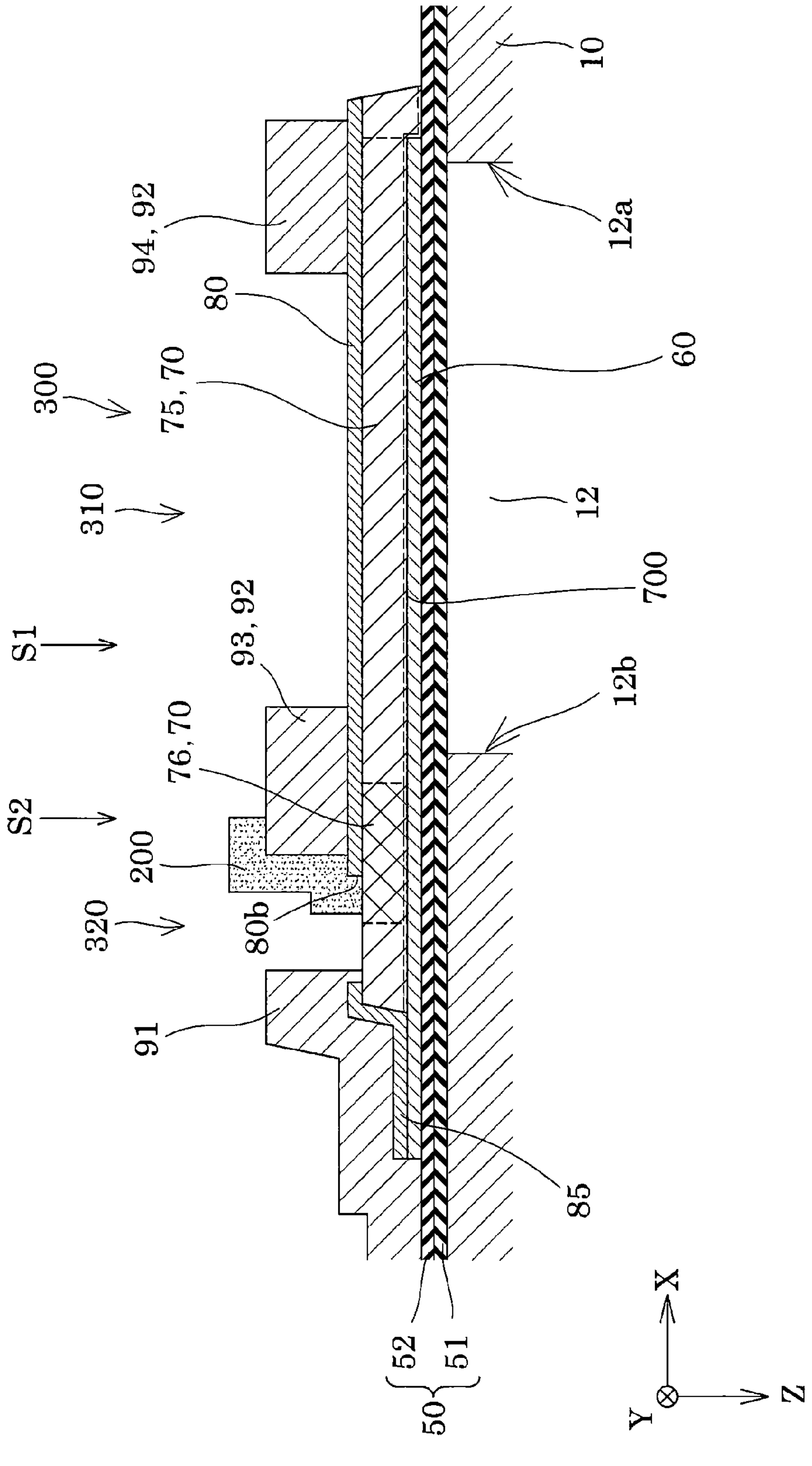
FIG. 22 is a sectional view of the main portion of the recording head according to the second embodiment.

FIG. 22 is a sectional view of an ink jet recording head which is an example of a liquid ejecting head according to a third embodiment of the present disclosure, and is an enlarged view illustrating the configuration of the piezoelectric actuator 300. The same members as those in the first embodiment are designated by the same reference numerals, and redundant descriptions will be omitted.

As illustrated in FIG. 22, the piezoelectric actuator 300 according to the present embodiment includes a protective film 200 provided on the side of the −Z direction of the second electrode 80, that is, the second electrode 80. The protective film 200 covers the end portion 80*b* of the second electrode 80 near the second area S2. That is, the protective film 200 is provided to cover the boundary portion between the active portion 310 and the inactive portion 320 of the piezoelectric actuator 300. The configuration other than the protective film 200 is similar to that of the first embodiment.

In the piezoelectric body layer 70 in the vicinity of the boundary between the active portion 310 and the inactive portion 320, for example, stress concentration may occur due to the non-uniform occurrence state of the piezoelectric strain, and as a result, the occurrence of cracks or burnout due to this crack may be noticeable. However, in the present embodiment, since the protective film 200 is provided to cover the boundary portion between the active portion 310 and the inactive portion 320, the occurrence of cracks and burnout in this area can be more reliably reduced.

Further, in the example illustrated in FIG. 22, the protective film 200 is provided only in the vicinity of the end portion 80*b* of the second electrode 80, but the range in which the protective film 200 is formed is not particularly limited. For example, the protective film 200 may be provided to cover the exposed portion of the surface of the piezoelectric body layer 70 of the inactive portion 320.

Further, the material of the protective film 200 is not particularly limited, but for example, an organic material such as polyimide (aromatic polyimide) can be used. Further, the protective film 200 may be formed of an epoxy-based adhesive or a silicon-based adhesive. Further, when the protective film 200 is formed by an adhesive, the adhesive for adhering the protective substrate 30 to the flow path forming substrate 10 may function as the protective film 200. That is, the protective substrate 30 may be adhered by an adhesive at a portion corresponding to the end portion 80*b* of the second electrode 80 of the flow path forming substrate 10, and the end portion 80*b* of the second electrode 80 may be covered with this adhesive.

Further, it is preferable that the Young's modulus of the protective film 200 is lower than the Young's modulus of the second electrode 80 in the second area S2. In the present embodiment, since the protective film 200 is formed of an organic material such as polyimide, the Young's modulus of the protective film 200 is lower than the Young's modulus of the second electrode 80 formed of a metal or the like such as iridium. As a result, the piezoelectric strain of the piezoelectric body layer 70 at the boundary portion between the active portion 310 and the inactive portion 320 is less likely to occur, and vibration is also more likely to be absorbed, and thus the occurrence of cracks and burnout can be reduced more reliably in this area.

Other Embodiments

Although each embodiment of the present disclosure has been described above, the basic configuration of the present disclosure is not limited to the above.

For example, in the embodiment described above, by adjusting the thickness of the crystal seed layer 61, the intermediate crystal seed layer 62, or the orientation layer 150 as the orientation control layer, the (100) orientation ratio of the second orientation portion 76 is made to be lower than the orientation ratio of the first orientation portion 75, but the method of adjusting the (100) orientation ratio of the first orientation portion 75 and the second orientation portion 76, that is, the method of adjusting the (100) orientation ratio of the piezoelectric body layer 70 is not particularly limited. For example, when the piezoelectric body layer 70 is formed, the (100) orientation ratio of the piezoelectric body layer 70 can be changed by adjusting the adhesion amount of impurities present on the first electrode 60 or the piezoelectric body film 74 of the first layer. More specifically, when the first electrode 60 or the piezoelectric body film 74 of the first layer is patterned using a mask made of an organic substance, a small portion of the mask is left in the portion in which the second orientation portion 76 is formed, and in this state, the remaining piezoelectric body layer 70 is formed. As a result, the (100) orientation ratio of the second orientation portion 76 can be made to be lower than the orientation ratio of the first orientation portion 75.

Further, in the embodiment described above, the present disclosure has been described by taking the configuration in the vicinity of the end portion 80*b* of the second electrode 80 in the −Y direction as an example, but the present disclosure, of course, can also be applied to the vicinity of the end portion 80*b* of the second electrode 80 in the +Y direction. When the boundary portion between the active portion 310 and the inactive portion 320 of the piezoelectric actuator 300 defined by the end portion 80*a* of the second electrode 80 are present on the outside of the pressure chamber 12 in the +Y direction, the above-described configuration of the present disclosure can also be applied to the side of the end portion 80*a* of the second electrode 80 in the +Y the direction.

Further, in each of the embodiments described above, the first electrode 60 may constitute an individual electrode for each active portion 310, and the second electrode 80 constitutes a common electrode of the plurality of active portions 310, but the first electrode 60 may constitute the common electrode of the plurality of active portions 310, and the second electrode 80 may constitute the individual electrode for each active portion 310. Even in this case, a similar effect as that of the embodiment described above can be obtained.

Figure 23:
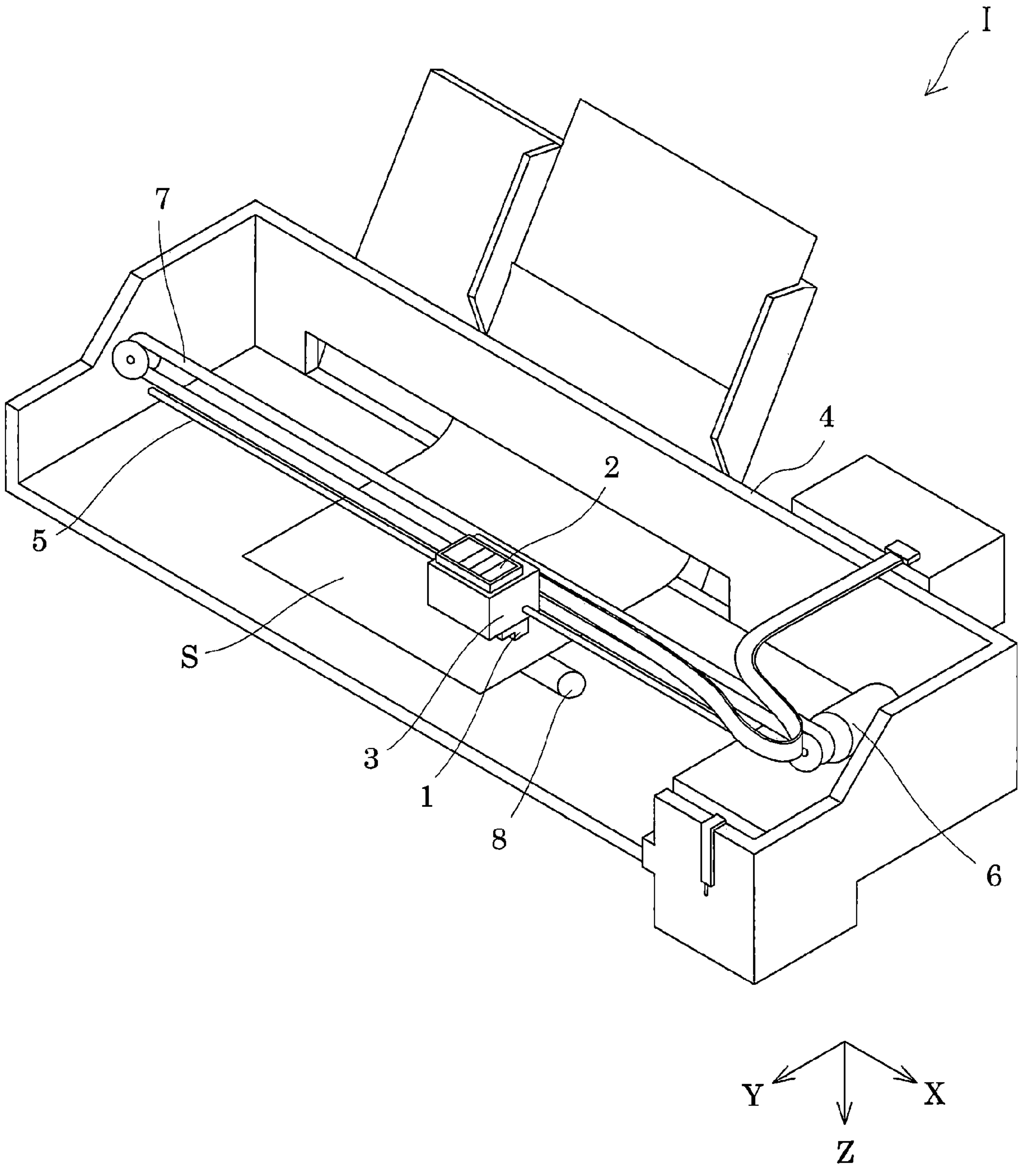
FIG. 23 is a diagram illustrating a schematic configuration of a recording apparatus according to an embodiment.

Further, the recording head 1 of each of these embodiments is mounted on an ink jet recording apparatus which is an example of a liquid ejecting apparatus. FIG. 23 is a schematic view illustrating an example of an ink jet recording apparatus which is an example of a liquid ejecting apparatus according to an embodiment.

In the ink jet recording apparatus I illustrated in FIG. 23, the recording head 1 is provided with a detachable cartridge 2 constituting an ink supply unit, and is mounted on a carriage 3. The carriage 3 on which the recording head 1 is mounted is provided to be movable in the axial direction of a carriage shaft 5 attached to an apparatus main body 4.

Then, the driving force of a drive motor 6 is transmitted to the carriage 3 via a plurality of gears (not illustrated) and a timing belt 7, so that the carriage 3 mounted with the recording head 1 is moved along the carriage shaft 5. On the other hand, the apparatus main body 4 is provided with a transport roller 8 as a transport unit, and a recording sheet S, which is a recording medium such as paper, is transported by the transport roller 8. The transport unit for transporting the recording sheet S is not limited to the transport roller, and may be a belt, a drum, or the like.

In such an ink jet recording apparatus I, when the recording sheet S is transported in the +X direction with respect to the recording head 1, and the carriage 3 is reciprocated in the Y direction with respect to the recording sheet S, by ejecting ink droplets from the recording head 1, the landing of ink droplets, so-called printing is performed over substantially the entire surface of the recording sheet S.

Further, in the ink jet recording apparatus I described above, an example is described in which the recording head 1 is mounted on the carriage 3 and reciprocates in the Y direction, which is the main scanning direction, but the present disclosure is not particularly limited thereto, and for example, the present disclosure can also be applied to a so-called line-type recording apparatus in which printing is performed simply by fixing the recording head 1 and moving the recording sheet S such as paper in the X direction, which is the sub scanning direction.

In the above embodiment, an ink jet recording head has been described as an example of the liquid ejecting head, and an ink jet recording apparatus has been described as an example of the liquid ejecting apparatus, but the present disclosure is intended for a wide range of liquid ejecting heads and liquid ejecting apparatuses in general, and of course, can be also applied to a liquid ejecting head and a liquid ejecting apparatus that eject a liquid other than ink. Other liquid ejecting heads include, for example, various recording heads used in an image recording apparatus such as a printer, a color material ejecting head used in manufacturing a color filter such as a liquid crystal display, an electrode material ejecting head used for forming an electrode such as an organic EL display and a field emission display (FED), a bioorganic substance ejecting head used for manufacturing a biochip, or the like, and the present disclosure can also be applied to a liquid ejecting apparatus provided with such a liquid ejecting head.

Further, the present disclosure is applied not only to a liquid ejecting head typified by an ink jet recording head, but also to other piezoelectric devices such as an ultrasonic device such as an ultrasonic transmitter, an ultrasonic motor, a pressure sensor, and a pyroelectric sensor.

What is claimed is:

1. A piezoelectric device comprising:

a substrate on which a plurality of recess portions are formed;

a diaphragm provided on a side of one surface of the substrate; and a piezoelectric actuator having a first electrode, a piezoelectric body layer, and a second electrode which are stacked in a first direction on a side of a surface opposite to the substrate of the diaphragm, wherein when one area far from an end portion of the second electrode is a first area, and one area near the end portion of the second electrode is a second area, of two areas of the second electrode in a second direction intersecting the first direction, a (100) plane orientation ratio of the piezoelectric body layer in the second area is lower than a (100) plane orientation ratio of the piezoelectric body layer in the first area, and one end of the second area of the piezoelectric body layer is positioned between the first electrode and the second electrode in the first direction.

2. The piezoelectric device according to claim 1, wherein the first area is in a driving area in which the diaphragm is in contact with a recess portion, and the second area is in a non-driving area in which the diaphragm is not in contact with the recess portion.

3. The piezoelectric device according to claim 1, wherein an orientation layer containing at least one selected from $LaNi_yO_x$, $SrRu_yO_x$, $(Ba,Sr)Ti_yO_x$, and $(Bi,Fe)Ti_yO_x$ is provided between the first electrode and the piezoelectric body layer, and a length of the orientation layer in the second area in the first direction is shorter than a length of the orientation layer in the first area in the first direction.

4. The piezoelectric device according to claim 3, wherein the orientation layer is composed of $LaNi_yO_x$.

5. The piezoelectric device according to claim 1, wherein the piezoelectric body layer has a surface layer portion in which titanium contents differs in the first area and the second area, on a side of the first electrode.

6. The piezoelectric device according to claim 5, wherein a titanium content of the surface layer portion in the second area is higher than a titanium content of the surface layer portion in the first area.

7. The piezoelectric device according to claim 6, wherein the piezoelectric body layer in the second area has (110) plane preferential orientation.

8. The piezoelectric device according to claim 5, wherein a titanium content of the surface layer portion in the second area is lower than a titanium content of the surface layer portion in the first area.

9. The piezoelectric device according to claim 8, wherein the piezoelectric body layer in the second area has (111) plane preferential orientation.

10. The piezoelectric device according to claim 1, wherein the piezoelectric body layer in the second area extends to an outside of the end portion of the second electrode.

11. The piezoelectric device according to claim 1, wherein a protective film which covers the end portion of the second electrode near the second area is provided.

12. A liquid ejecting head comprising:

a substrate on which a plurality of recess portions are formed;

a diaphragm provided on a side of one surface of the substrate; and a piezoelectric actuator having a first electrode, a piezoelectric body layer, and a second electrode which are stacked in a first direction on a side of a surface opposite to the substrate of the diaphragm, wherein when one area far from an end portion of the second electrode is a first area, and one area near the end portion of the second electrode is a second area, of two areas of the second electrode in a second direction intersecting the first direction, a (100) plane orientation ratio of the piezoelectric body layer in the second area is lower than a (100) plane orientation ratio of the piezoelectric body layer in the first area, and one end of the second area of the piezoelectric body layer is positioned between the first electrode and the second electrode in the first direction.

13. A liquid ejecting apparatus comprising the liquid ejecting head according to claim 12.

14. The piezoelectric device according to claim 1, wherein the piezoelectric body layer in the first area has (100) plane preferential orientation.

15. The liquid ejecting head according to claim 12, wherein the piezoelectric body layer in the first area has (100) plane preferential orientation.

16. The piezoelectric device according to claim 1, wherein the second area of the piezoelectric body layer has a portion which is positioned between the first electrode and the second electrode in the first direction and a portion which is positioned above the first electrode and does not overlap the second electrode in the first direction.

* * * * *